(12) United States Patent
Akselrod et al.

(10) Patent No.: US 11,092,675 B2
(45) Date of Patent: Aug. 17, 2021

(54) LIDAR SYSTEMS BASED ON TUNABLE OPTICAL METASURFACES

(71) Applicant: Lumotive, LLC, Bellevue, WA (US)

(72) Inventors: Gleb M. Akselrod, Bellevue, WA (US); Prasad Padmanabha Iyer, Renton, WA (US); Ross D. Uthoff, Seattle, WA (US)

(73) Assignee: Lumotive, LLC, Bellevue, WA (US)

( * ) Notice: Subject to any disclaimer, the term of this patent is extended or adjusted under 35 U.S.C. 154(b) by 0 days.

(21) Appl. No.: 17/098,213

(22) Filed: Nov. 13, 2020

(65) Prior Publication Data

US 2021/0141060 A1    May 13, 2021

Related U.S. Application Data

(60) Provisional application No. 62/934,916, filed on Nov. 13, 2019.

(51) Int. Cl.
*G01S 7/486* (2020.01)
*G01S 7/481* (2006.01)
(Continued)

(52) U.S. Cl.
CPC .............. *G01S 7/486* (2013.01); *G01S 7/484* (2013.01); *G01S 7/4817* (2013.01); *G02F 1/292* (2013.01); *G01S 17/88* (2013.01); *G02B 1/002* (2013.01)

(58) Field of Classification Search
CPC ........ G01S 7/486; G01S 7/4817; G01S 7/484; G01S 17/88; G02F 1/292; G02B 1/002
(Continued)

(56) References Cited

U.S. PATENT DOCUMENTS 6,844,946 B2   1/2005 Buse
9,040,428 B2   5/2015 Hong et al.
(Continued)

FOREIGN PATENT DOCUMENTS

JP   2005345402 A   12/2005
WO   WO 2018-039455 A1   3/2018
(Continued)

OTHER PUBLICATIONS

"unique" definition, Merrian-Webster, downloaded Jan. 15, 2021 from https://www.merriam-webster.com/dictionary/unique, 9 pages. (Year: 2021).*
(Continued)

*Primary Examiner* — Daniel L Murphy
(74) *Attorney, Agent, or Firm* — Phillips Winchester; Justin K. Flanagan

(57) ABSTRACT

An example optical transceiver system, such as a solid-state light detection and ranging (lidar) system, includes a tunable, optically reflective metasurface to selectively reflect incident optical radiation as transmit scan lines at transmit steering angles between a first steering angle and a second steering angle. In some embodiments, a feedback element, such as a volume Bragg grating element, may lock a laser to narrow the band of optical radiation. A receiver may include a tunable, optically reflective metasurface for receiver line-scanning or a two-dimensional array of detector elements forming a set of discrete receive scan lines. In embodiments incorporating a two-dimensional array of detector elements, receiver optics may direct optical radiation incident at each of a plurality of discrete receive steering angles to a unique subset of the discrete receive scan lines of detector elements.

19 Claims, 22 Drawing Sheets

(51) Int. Cl.
*G01S 7/484* (2006.01)
*G01S 17/88* (2006.01)
*G02B 1/00* (2006.01)
*G02F 1/29* (2006.01)

(58) Field of Classification Search
USPC ............................................. 356/5.03
See application file for complete search history.

(56) References Cited

U.S. PATENT DOCUMENTS

| | | | |
|---|---|---|---|
| 9,104,086 | B1 | 8/2015 | Davids |
| 9,195,052 | B2 | 11/2015 | Long et al. |
| 9,804,329 | B2 | 10/2017 | Montazeri et al. |
| 9,935,375 | B2 | 4/2018 | Bowers |
| 9,946,076 | B2 * | 4/2018 | Smits .................. H04N 13/356 |
| 10,199,415 | B2 | 2/2019 | Akselrod |
| 10,254,448 | B2 | 4/2019 | Lee |
| 10,303,038 | B2 | 5/2019 | Kim et al. |
| 10,332,923 | B2 | 6/2019 | Josberger |
| 10,451,800 | B2 | 10/2019 | Akselrod |
| 10,627,571 | B1 | 4/2020 | Akselrod |
| 10,665,953 | B1 | 5/2020 | Akselrod |
| 10,670,782 | B2 | 6/2020 | Arbabi et al. |
| 10,720,712 | B2 * | 7/2020 | Foo ...................... H01Q 15/004 |
| 10,816,939 | B1 * | 10/2020 | Coleman .................. G01S 7/00 |
| 2002/0081445 | A1 | 6/2002 | Kadomura et al. |
| 2003/0174940 | A1 | 9/2003 | Charlton et al. |
| 2004/0037497 | A1 | 2/2004 | Lee |
| 2004/0125266 | A1 | 7/2004 | Miyauchi et al. |
| 2005/0117866 | A1 | 6/2005 | Park et al. |
| 2006/0202125 | A1 | 9/2006 | Suhami |
| 2006/0239688 | A1 | 10/2006 | Hillis et al. |
| 2006/0284187 | A1 | 12/2006 | Wierer, Jr. et al. |
| 2007/0013983 | A1 | 1/2007 | Kitamura et al. |
| 2009/0067774 | A1 | 3/2009 | Magnusson |
| 2010/0156573 | A1 | 6/2010 | Smith |
| 2011/0134496 | A1 | 6/2011 | Tompkin et al. |
| 2011/0244613 | A1 | 10/2011 | Heck et al. |
| 2012/0194399 | A1 | 8/2012 | Bily |
| 2012/0267694 | A1 | 10/2012 | Kaiser et al. |
| 2013/0129293 | A1 | 5/2013 | Ogawa et al. |
| 2013/0286633 | A1 | 10/2013 | Rodriguez |
| 2014/0038320 | A1 | 2/2014 | Wang |
| 2014/0085693 | A1 | 3/2014 | Mosallaei et al. |
| 2014/0266946 | A1 | 9/2014 | Bily |
| 2014/0294338 | A1 | 10/2014 | Long et al. |
| 2015/0036198 | A1 | 2/2015 | Inokuchi |
| 2015/0162658 | A1 | 6/2015 | Bowers et al. |
| 2015/0318618 | A1 | 11/2015 | Chen |
| 2015/0318620 | A1 | 11/2015 | Black |
| 2015/0372389 | A1 | 12/2015 | Chen |
| 2015/0380828 | A1 | 12/2015 | Black |
| 2017/0030773 | A1 | 2/2017 | Samsung |
| 2017/0153528 | A1 | 6/2017 | Kim et al. |
| 2017/0212285 | A1 | 7/2017 | Arbabi |
| 2018/0047774 | A1 | 2/2018 | Garreau et al. |
| 2018/0076521 | A1 | 3/2018 | Mehdipour et al. |
| 2018/0138576 | A1 | 5/2018 | Cohen |
| 2018/0239021 | A1 * | 8/2018 | Akselrod ............... H04N 5/374 |
| 2018/0239213 | A1 | 8/2018 | Akselrod |
| 2018/0241131 | A1 | 8/2018 | Akselrod |
| 2018/0248267 | A1 | 8/2018 | Akselrod |
| 2019/0006533 | A1 | 1/2019 | Goldan et al. |
| 2019/0243208 | A1 | 8/2019 | Peng et al. |
| 2019/0252441 | A1 | 8/2019 | Akselrod |
| 2019/0285798 | A1 | 9/2019 | Akselrod |
| 2019/0294104 | A1 | 9/2019 | Rho et al. |
| 2019/0377084 | A1 | 12/2019 | Sieasman et al. |
| 2020/0303826 | A1 | 9/2020 | Askelrod |

FOREIGN PATENT DOCUMENTS

| | | |
|---|---|---|
| WO | 2018/156643 | 8/2018 |
| WO | 2018/156793 | 8/2018 |
| WO | WO 2018-156688 | 8/2018 |
| WO | 2018/210776 A1 | 11/2018 |

OTHER PUBLICATIONS

Huang et al., "Gate-tunable conducting oxide metasurfaces," Nano Left. 16, 5319 (2016).
Pors, Bozhevolnyi, "Plasmonic metasurfaces for efficient phase control in reflection," Opt. Express 21, 27438 (2013).
Arbabi, Hone, Ball, Bagheri, Faraon, "Subwavelength-thick lenses with high numerical apertures and large efficiency based on high contrast transmitarrays," Nat. Commun. 6, 1 (2014).
Haffner et al., "All-plasmonic Mach-Zehnder modulator enabling optical high-speed communication at the microscale." Nat. Photonics 9, 525-528 (2015).
Li et al., "Poling efficiency enhancement of tethered binary nonlinear optical chromophores for achieving an ultrahigh n3r33 figure-of-merit of 2601 pm V?1" J. Mater. Chem. C 3, 6737-6744 (2015).
Zhang et al., "High performance optical modulator based on electro-optic polymer filled silicon slot photonic crystal waveguide," J. Light. Technol. 34, 2941-2951 (2016).
Xing et al., "Digitally controlled phase shifter using an SOI slot waveguide with liquid crystal infiltration," 27, 1269-1272 (2015).
Borshch, Shiyanovskii, and Lavrentovich, "Nanosecond electro-optic switching of a liquid crystal," Phys. Rev. Lett. 111, 107802 (2013).
Chen et al., "Ultra-low viscosity liquid crystal materials," Opt. Mater. Express 5, 655 (2015).
Gholipour, Zhang, MacDonald, Hewak, and Zheludev, "An all-optical, non-volatile, bidirectional, phase-change meta-switch," Adv. Mater 25, 3050 (2013).
Raoux, Xiong, Wuttig, and Pop, "Phase change materials and phase change memory," MRS Bull. 39, 703 (2014).
Rios, et al., "Integrated all-photonic non-volatile multi-level memory," Nat. Photonics 9, 725 (2015).
International Application No. PCT/US2018/019107, International Search Report dated Jun. 25, 2018; pp. 1-3.
U.S. Appl. No. 15/900,676, Requirement for Restriction/Election dated Jun. 25, 2020, pp. 1-7.
Funkhouser, T. et al., 'Survey of Methods for Modeling Sound Propagation in Interactive Virtual Environment Systems,' Princeton University, Department of Computer Science, 2003, pp. 1-53.
U.S. Appl. No. 15/924,744, Non-Final Office Action dated Feb. 15, 2019, pp. 1-11.
U.S. Appl. No. 16/357,288 Non-Final Office Action dated Oct. 7, 2020, pp. 1-8.
International Patent Application No. PCT/US20/22599, International Search Report and Written Opinion dated Jul. 23, 2020, 12 pp.
Arbabi, et al., Dielectric Metasuifaces for Complete Control of Phase and Polarization with Subwavelength Spatial Resolution and High Transmission, arXiv:1411.1494v2 [physics.optics], Sep. 4, 2015, pp. 1-27.

* cited by examiner

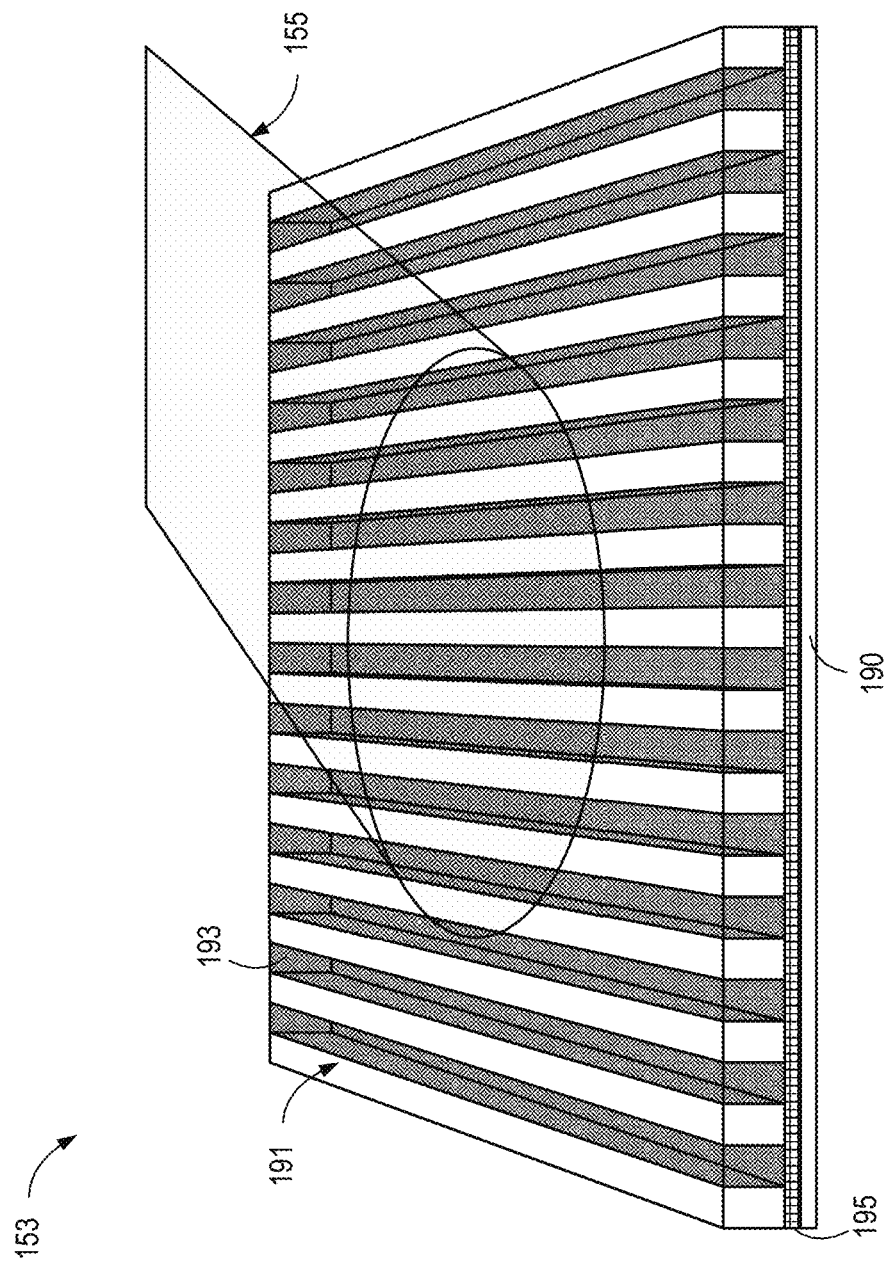

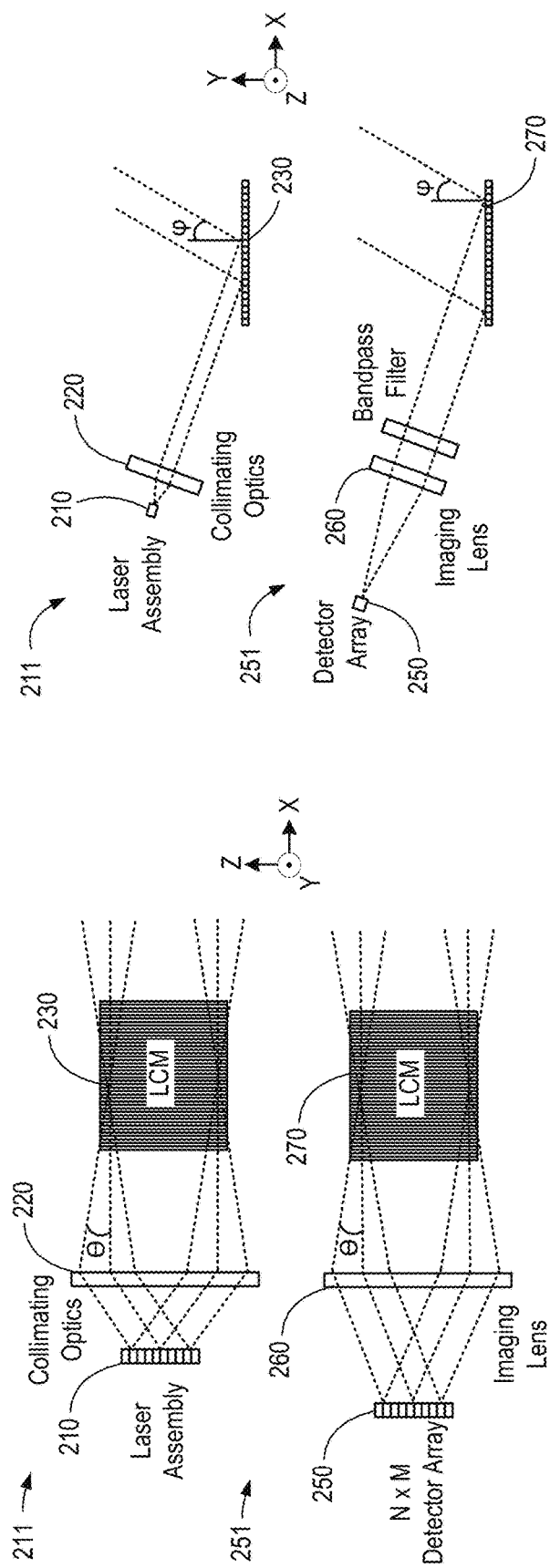
FIG. 2A
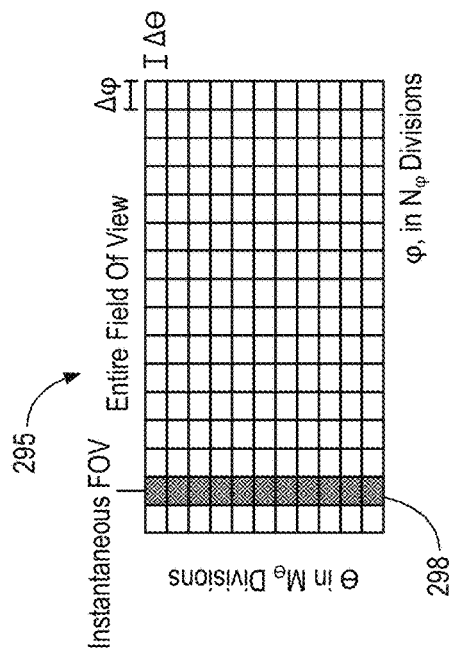
FIG. 2B
FIG. 2C

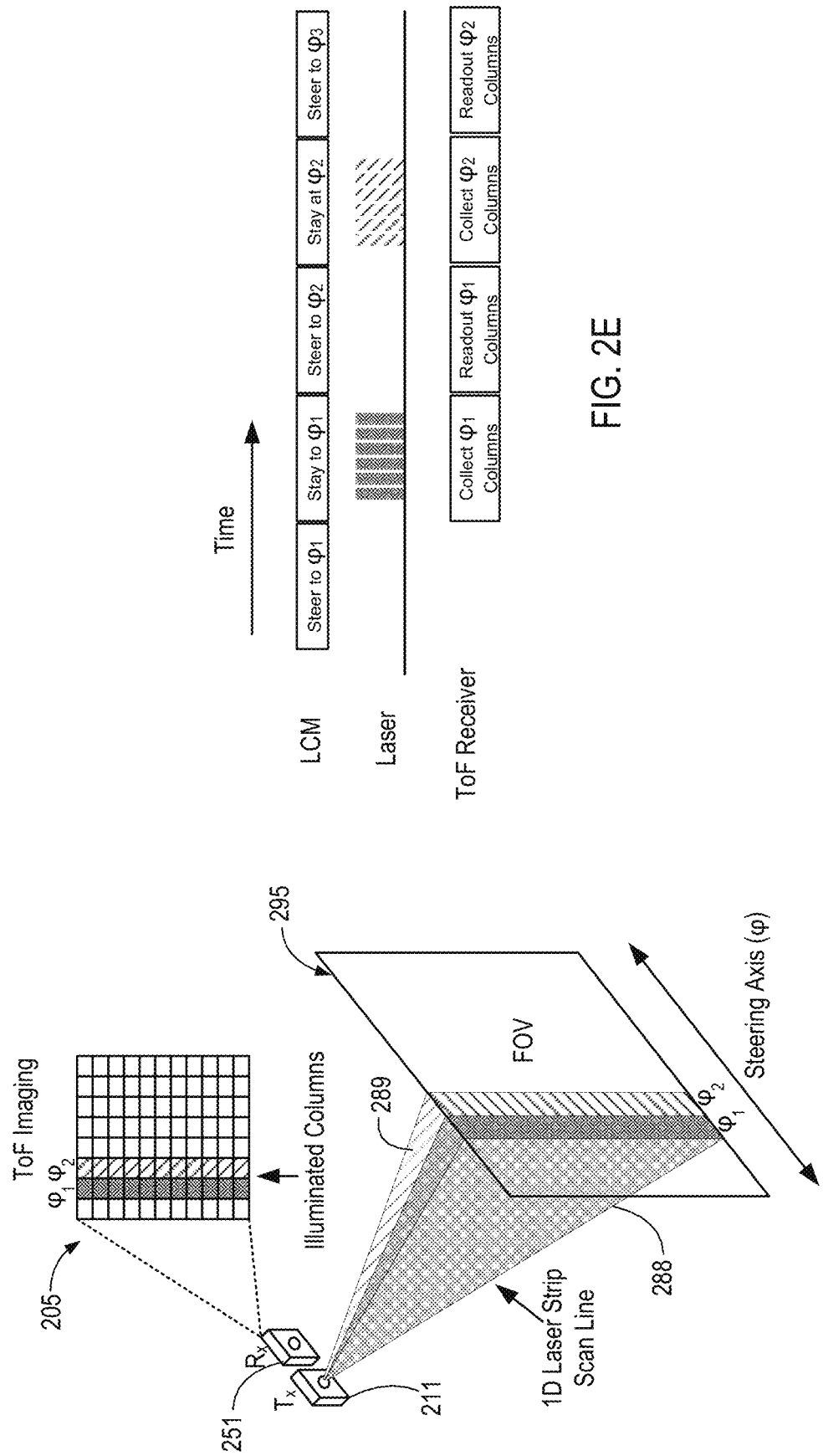

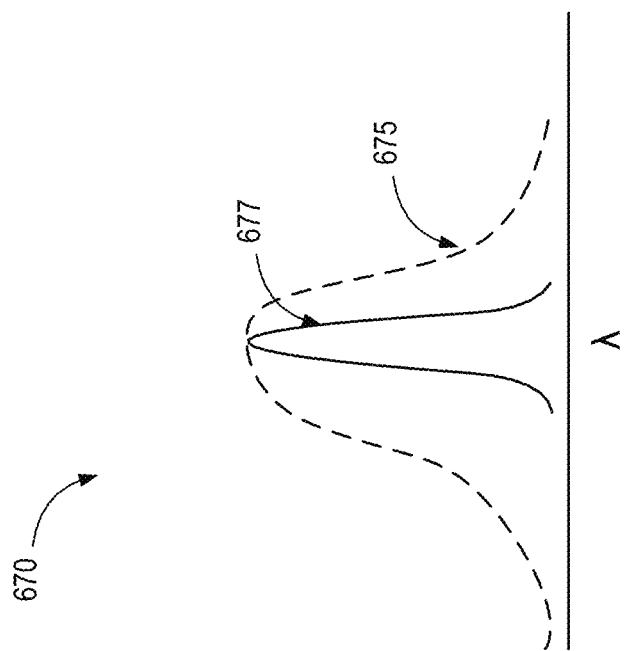
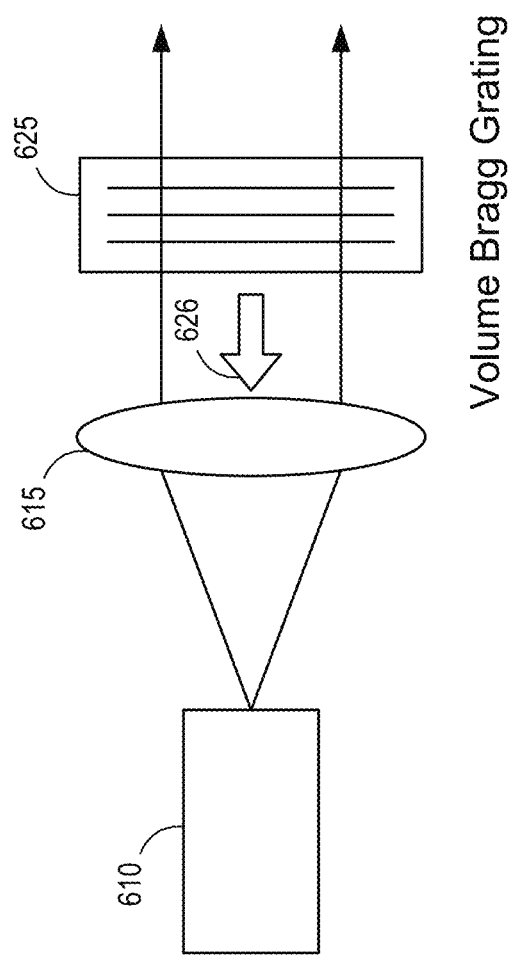
FIG. 6

LIDAR SYSTEMS BASED ON TUNABLE OPTICAL METASURFACES

RELATED APPLICATION

This application claims priority to and benefits under 35 U.S.C. § 119 to U.S. Provisional Patent Application No. 62/934,916, filed on Nov. 13, 2019, titled "Optical Metasurface Devices and Configurations," which application is hereby incorporated by reference in its entirety.

TECHNICAL FIELD

This disclosure relates to optical resonators, including liquid crystal metasurfaces. More generally, this disclosure relates to tunable antenna systems for transmitting and receiving optical radiation, including lidar systems.

BRIEF DESCRIPTION OF THE DRAWINGS

FIG. 1 illustrates an example block diagram of a tunable liquid crystal metasurface (LCM) of the solid-state optical transceiver system of FIG. 1A, according to one embodiment.

FIG. 2A illustrates an example block diagram of a top view of the optical paths of an example transmitter subsystem and an example steering receiver subsystem, according to one embodiment.

FIG. 2B illustrates an example block diagram of a side view of the optical paths of the example transmitter subsystem and the example steering receiver subsystem of FIG. 2A.

FIG. 2C illustrates an example block diagram of the instantaneous field of view and the entire field of view of a solid-state transceiver system utilizing the example transmitter subsystem and the example steering receiver subsystem of FIG. 2A.

FIG. 2D illustrates azimuth scanning via a solid-state transceiver, according to one embodiment.

FIG. 2E illustrates an example timeline of the discrete steering, collecting, and readout processes for the azimuth scanning by the solid-state transceiver of FIG. 2D, according to one embodiment.

FIG. 6 illustrates an example of an optical feedback element to narrow the linewidth of the optical radiation source, according to one embodiment.

DETAILED DESCRIPTION

Figure 3:
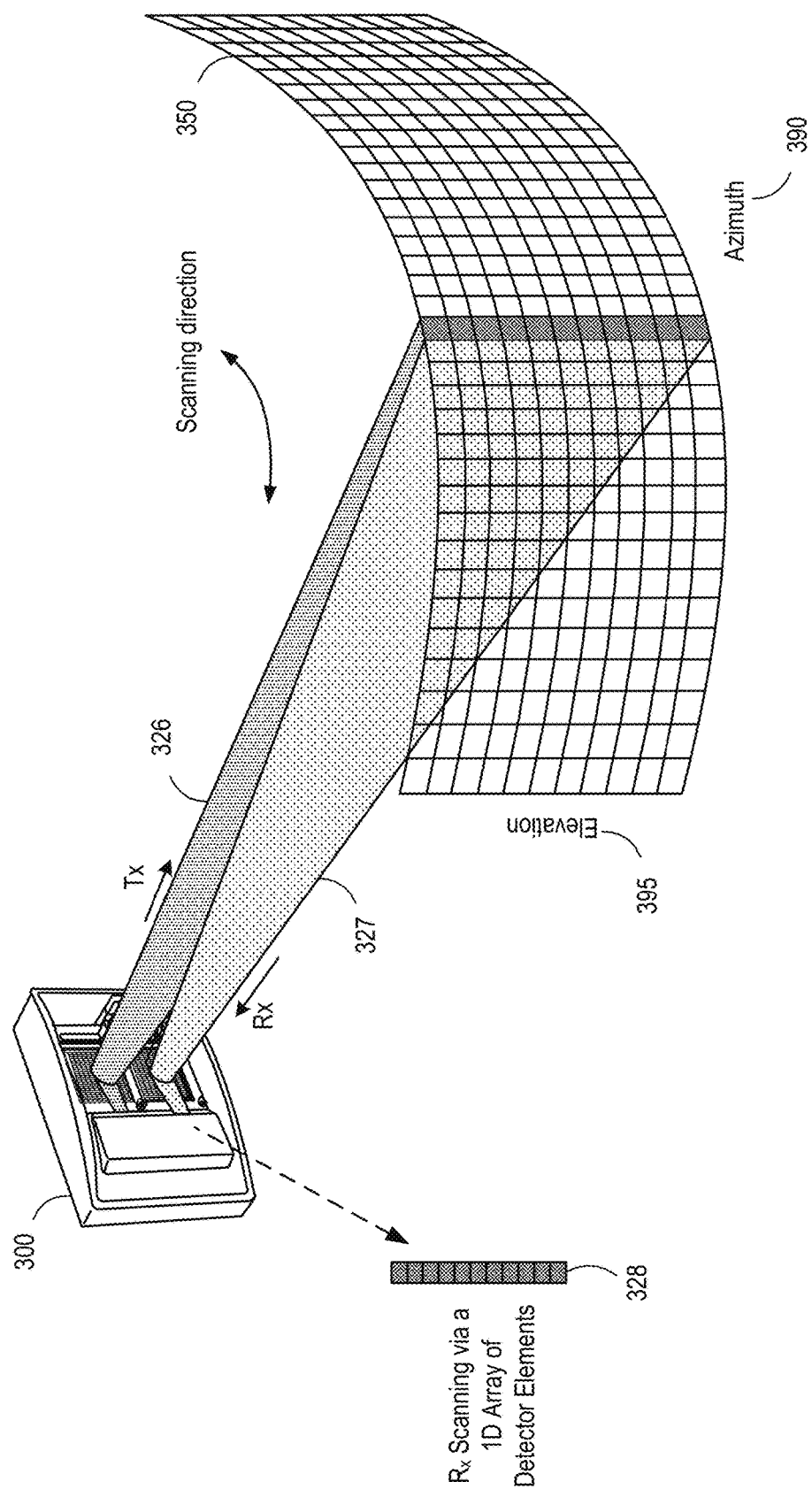
FIG. 3 illustrates an embodiment of a solid-state transceiver system to implement one-dimensional transmit and receive scanning, according to one embodiment.

An optical transceiver system, such as a solid-state light detection and ranging (lidar) system, may include a transmitter subsystem (the "transmitter") and a receiver subsystem (the "receiver"). The transmitter may include a tunable, optical metasurface to selectively transmit incident optical radiation at transmit steering angles between a first steering angle and a second steering angle. For example, the optical metasurface may be an optically reflective metasurface, such as a tunable, liquid crystal metasurface (LCM) with an array of optical resonant antennas arranged at sub-wavelength intervals on a reflective surface. The LCM may include liquid crystal positioned in optical field regions of each optical resonant antenna in the array. Many of the embodiments described herein assume an LCM configured for one-dimensional steering in which the optical resonant antennas are elongated and extend from an optically reflective surface. The optical resonant antennas may be substantially parallel to one another. Many of the embodiments described herein may be adapted or otherwise configured for use with an LCM capable of two-dimensional steering.

A voltage controller may control the transmit steering angle of the LCM by selectively applying voltage differential bias patterns to the liquid crystal within the optical field regions of at least some of the optical resonant antennas. In various embodiments, the transmitter subsystem may generate transmit scan lines of optical radiation with a fixed elevational beam height between 15 and 120 degrees (e.g., 30 degrees) and a relatively narrow beam linewidth between 0.01 and 5 degrees (e.g., 0.5 degrees) in the scanning axis. The transmitter may steer the transmit scan line along an azimuth between a first steering angle and a second steering angle (e.g., between negative 60 degrees and positive 60 degrees). In some embodiments, the elevational beam divergence may be fixed values based on the configuration of optical elements, the laser bandwidth, and/or the optical metasurface configuration. As used herein, the non-steering axis is referred to as the elevation, while the steering axis is referred to as the azimuth. The system can be rotated 90 degrees in some applications to steer along the elevation with the azimuth as the non-steering axis.

The transmitter may include a laser assembly with one or more lasers to transmit optical radiation to the optical metasurface. The laser assembly may comprise, for example, one or more lasers to transmit optical radiation at one or more operating wavelengths. An operating wavelength, as used and described herein, may be a single wavelength of optical radiation or a narrow band of wavelengths. According to various embodiments described herein, a laser assembly may generate optical radiation having a wavelength or range of wavelengths between approximately 700 nanometers and 2000 nanometers. Specific examples of operating wavelengths suitable for lidar include operating wavelengths of 850 nanometers, 905 nanometers, 940 nanometers, and 1550 nanometers. The laser assembly may comprise one or more edge-emitting laser diodes, vertical-cavity surface-emitting lasers, fiber optical laser devices, frequency-modulated continuous-wave laser devices, and diode-pumped solid-state lasers.

In some examples, the laser assembly may comprise one or more lasers that transmit optical radiation at an initial bandwidth in an unlocked state and a narrower, post-initialization bandwidth in a locked state. A feedback element, such as a volume Bragg grating, may be positioned between the laser assembly and the optical metasurface. The feedback element may reflect some of the optical radiation at a wavelength within the initial bandwidth back into the laser (s) of the laser assembly to cause the laser(s) to transition from the unlocked state to the locked state. The feedback element may be part of an optical assembly that includes one or more lenses (e.g., a convex lens, a concave lens, a prism, a biconvex lens, a plano-convex lens, a positive meniscus, a negative meniscus, a plano-concave lens, a biconcave lens, etc.). In some examples, an optical assembly may additionally or alternatively include a holographic metamaterial lens and/or a waveguide.

In some embodiments, the receiver may include another tunable, optical metasurface to steerably receive scan lines corresponding to transmit scan lines of optical radiation. The receive optical metasurface may generate a receive scan line corresponding to the transmit scan line. For instance, the receive scan line of optical radiation may have an elevational beam height between 15 and 120 degrees (e.g., 30 degrees) and a relatively narrow beam linewidth between 0.01 and 5 degrees (e.g., 0.5 degrees) in the scanning axis. The receiver may steer the receive scan line along an azimuth between the first steering angle and the second steering angle (e.g., between negative 60 degrees and positive 60 degrees) corresponding to the transmit steering angle.

In other embodiments, the receiver may comprise a two-dimensional array of detector elements. The detector elements may be arranged in rows and columns. One or more columns may operate to form a receive scan line of detector elements. Accordingly, the collective set of columns of detector elements may form a set of discrete receive scan lines, where each discrete receive scan line may correspond to a discrete receive steering angle. Receiver optics may direct optical radiation incident at each of the discrete receive steering angles to a unique subset of the discrete receive scan lines.

A controller may tune the transmit optical metasurface to transmit a transmit scan line of optical radiation at a first transmit steering angle (e.g., 15 degrees) with a relatively narrow linewidth and fixed elevational beam height. The transmit scan line may rebound (i.e., reflect) off a distant object. The receiver optics may direct optical radiation incident at a 15-degree receive steering angle to one of a set of discrete receive scan lines comprising one or more columns of detector elements. Accordingly, to detect the rebounded (i.e., reflected) optical radiation from the transmit scan line, the controller may cause the receiver to detect reflections of the optical radiation via the subset columns corresponding to the receive scan line that maps to (e.g., is the same as, corresponds to, or matches) the transmit scan line.

In a specific lidar system embodiment, a tunable, optically reflective metasurface selectively reflects (or, in some embodiments, refracts) incident optical radiation as transmit scan lines at transmit steering angles between a first steering angle and a second steering angle. A laser assembly transmits optical radiation to the tunable, optically reflective metasurface. A receiver comprising a two-dimensional array of detector elements forms a set of receive scan lines, where each receive scan line comprises one or more columns of detector elements. The vertical resolution of the receiver corresponds to the number of rows of detector elements in the two-dimensional array of detector elements.

In one specific example, a transmit scan line has an elevational beam height of 120 degrees and is scanned between negative 60 degrees and positive 60 degrees. The two-dimensional array of detector elements may have 600 columns of detector elements and 600 rows of detector elements (360,000 detector elements in total). Receiver optics may map each column of detector elements to a unique receive steering angle, such that the horizontal resolution in the azimuth steering angle is approximately 0.2 degrees (120/600), and the vertical resolution is approximately 0.2 degrees (120/600).

In various embodiments, a controller may cause a laser assembly to emit optical radiation (e.g., as pulsed optical radiation or as a continuous wave, such as via a frequency-modulated continuous-wave laser source) to the tunable, optically reflective metasurface. The controller may tune (e.g., via a voltage controller) the optically reflective metasurface to reflect the pulse of optical radiation as transmit scan lines at various transmit steering angles. In some instances, the controller may sweep the transmit scan line from a first transmit steering angle to a second transmit steering angle (e.g., negative 45 degrees to positive 45 degrees, or some other range of azimuth angles). The controller may cause the receiver to steer a receive scan line (in the case of a steerable receiver) to correspond to the transmit steering angle. Alternatively, the controller may cause the receiver to detect reflections of the pulsed optical radiation via receive scan lines of detector elements (in the case of a two-dimensional array of detector elements). For example, the controller may detect reflections of the pulsed optical radiation via different sets of columns of detector elements corresponding to unique receive scan lines corresponding to the transmit scan lines for each different transmit scan angle.

Transmit scan lines are transmitted from the optically reflective metasurface to a remote object at the transmit steering angle. Optical radiation is reflected by the remote object back to the system and received by the detector elements at a corresponding receive steering angle. Each detector element may comprise a photodiode, an avalanche photodiode (APD), a single-photon avalanche diode (SPAD), and/or another type of photon detection element. The controller may determine (e.g., calculate or estimate) a range to the remote object for each detector element for a given receive scan line. In some embodiments, a solid-state transceiver system may determine range(s) via a pulsed direct time-of-flight detection approach. In other embodiments, a solid-state transceiver system may determine range(s) via a continuous wave coherent heterodyne calculation approach or an indirect time-of-flight detection approach.

Each receive scan line comprises one or more columns of detector elements. The receiver optics map optical radiation from each of a plurality of discrete receive steering angles to a unique receive scan line. Accordingly, the horizontal resolution of the ranging corresponds to the number of receive scan lines. The vertical resolution of the ranging corresponds to the number of rows of detector elements.

Any of the embodiments described herein may utilize a steerable LCM for generating steerable transmit scan lines. The steerable LCM may include an optical assembly that includes a diffractive grating and/or a refractive cylindrical lens positioned between the laser assembly and the LCM and/or between the LCM and remote objects. In some embodiments, the optical assembly may evenly distribute the optical radiation from the laser assembly incident on the LCM. In other embodiments, the optical assembly may distribute a center-weighted or edge-weighted distribution of optical radiation on the LCM.

In some embodiments, the laser assembly may include a plurality of edge-emitting laser diodes that emit light on their long axis to inherently provide a distribution of optical radiation along one axis of the LCM. The laser assembly may include one or more drivers to drive any number of lasers. The drivers may, for example, pulse the lasers with optical radiation having a target pulse width. For example, the lasers may pulse optical radiation with a pulse-width between 2 and 10 nanoseconds.

As alluded to above and described in greater detail below, beam steering by a transmit optical metasurface may be inherently dispersive for a bandwidth of optical radiation. For example, an optical metasurface may be tuned to a steering angle of 45 degrees for a given wavelength of optical radiation but exhibit slightly different steering angles for deviations from the given wavelength. In some implementations, a 5-nanometer linewidth of optical radiation may exhibit approximately 1 degree of divergence at a negative 60-degree steering angle. Accordingly, a narrower bandwidth of optical radiation may be desirable to decrease the linewidth of the transmit scan line, increase the possible maximum resolution of the system, and/or decrease the signal-to-noise (SNR) of received optical radiation. The optical assembly may include a feedback element, such as a volume Bragg grating element, to lock the lasers of the laser assembly (e.g., via injection seeding, reverse-reflection seeding, and/or the like).

Lockable lasers may generate optical radiation having a linewidth between 2 and 10 nanometers in an unlocked state. For example, a 905-nanometer laser assembly may generate optical radiation in an unlocked state with a linewidth of approximately 5 nanometers, such that the optical radiation incident on the LCM is between 903.5 nanometers and 906.5 nanometers. A volume Bragg grating element and/or another feedback element may lock the laser assembly with 905-nanometer optical radiation. Once locked, the 905-nanometer laser assembly may generate optical radiation with a linewidth of approximately 0.5 nanometers, such that the optical radiation incident on the LCM is between 904.75 nanometers and 905.25 nanometers. The narrower linewidth of the optical radiation incident on the LCM reduces the dispersivity at various transmit steering angles to increase the possible resolution of the system and/or decrease the SNR at a given transmit and receive steering angle.

In some embodiments, the optical assembly may include any number of optical elements, such as lenses and prisms, to control the distribution of optical radiation on the LCM. In some embodiments, the optical radiation from the laser assembly is incident on the LCM in which such that the optical radiation is incident on the LCM parallel to the elongated optical resonant antennas thereof. In this configuration, the transmit scan lines may be symmetrically curved at some transmit steering angles relative to other transmit steering angles.

In other embodiments, the optical radiation from the laser assembly is incident on the LCM perpendicular to the elongated optical resonant antennas thereof. In this configuration, the transmit scan lines may be asymmetrically curved at positive and negative steering angles relative to a steering angle normal to the surface of the LCM. In some embodiments, optical elements between a laser assembly and the transmit LCM may asymmetrically shape the optical radiation that is incident on the LCM perpendicular to the elongated optical resonant antennas such that that the transmit scan lines steerably reflected by the LCM are symmetrically curved at some transmit steering angles relative to other transmit steering angles.

As described herein, an optically reflective LCM may include an optically reflective surface, such as a metal surface selected to reflect optical radiation within a specific bandwidth. A large number of elongated optical resonant antennas may be positioned on the reflective surface. The optical resonant antennas may have sub-wavelength features and be arranged with sub-wavelength spacing. For example, the individual optical resonant antennas and the spacings therebetween may be less than one-half of a wavelength.

In various embodiments, liquid crystal may be positioned around the optical resonant antennas, as a layer on top of the optical resonant antennas, and/or as part of the optical resonant antennas. A digital or analog controller may selectively apply varying voltage differentials across the liquid crystal within optical field regions of each of the optical resonant antennas. The voltage controller may apply a voltage differential bias pattern, such as a grating pattern (e.g., a blazed grating pattern), to the metasurface to attain a target beam steering angle.

A one-dimensional voltage bias pattern may be applied to liquid crystal within the optical field regions of a one-dimensional array of optical resonant antennas to effectuate one-dimensional beam steering. A two-dimensional voltage bias pattern may be applied to liquid crystal within the optical field regions of a two-dimensional array of optical resonant antennas to effectuate two-dimensional beam steering and/or spatial beamforming. One-dimensional beam steering, two-dimensional beam steering, and spatial beamforming are generally referred to herein as being encompassed by the term "beamforming" or "steering" in context.

The metasurface may have a default reflection angle or reflection pattern based on the reflective properties of the optically reflective surface, the unbiased optical resonant antennas, and the unbiased liquid crystal. In various embodiments, biasing the liquid crystal changes the reflection phase of the optical radiation proximate to the associated optical resonant antennas. Each different voltage pattern across the metasurface corresponds to a different reflection phase pattern. With a one-dimensional array of optical resonant antennas, each different reflection phase pattern corresponds to a different steering angle in a single dimension. With a two-dimensional array of optical resonant antennas, each different reflection phase pattern may correspond to a different two-dimensional beam steering angle. Alternatively, each different reflection pattern may be used to effectuate a unique spatial beam form.

A wide variety of shapes, sizes, materials, configurations, and the like may be utilized. Optical resonant antennas may, for example, be formed as metal rails extending from the optically reflective surface. In some embodiments, a deposit of liquid crystal may fill part of each channel between adjacent optical resonant antennas. In other embodiments, the liquid crystal may be formed as a layer on top of the optical resonant antennas that fills the channels therebetween.

A voltage controller may apply a voltage pattern to the metal rails to bias the liquid crystal associated therewith to attain a target reflection phase pattern. In embodiments in which the optically reflective surface is metal and the optical resonant antennas are metal, a dielectric or another insulator may separate the optically reflective metal surface and the optical resonant antennas. The voltage controller may be connected to the metal rails via contacts around a perimeter of the metasurface or via insulated thru-bores in the metal surface.

Copper is an example of a metal suitable and cost-effective for infrared bandwidths commonly used for lidar, such as 850-nanometer, 905-nanometer, or 1550-nanometer lidar systems. Copper may also be used for a variety of other operational wavelengths. Other metals (e.g., gold, silver, aluminum, etc.), various dielectrics, and metal-coated dielectrics are known to be highly reflective at various wavelengths and may be utilized in alternative embodiments. It is appreciated that some materials, as known in the art, may be preferred for visible wavelengths, other materials may be more suitable for ultraviolet wavelengths, and still other materials may be more suitable for infrared wavelengths.

To provide a specific example, an optically reflective LCM may include a planar copper reflector covered with silicon dioxide. Between 10,000 and 1,000,000 copper rails extend from the silicon dioxide-covered copper reflector. The copper rails may be subdivided into subsets of copper rails. Each subset of copper rails includes between 100 and 100,000 copper rails. The tunable metasurface may include a number of electrical contacts equal to the number of copper rails in each subset.

For example, each subset of copper rails may include 1,000 rails, and the tunable optical metasurface may include 50 subsets for a total of 50,000 metal rails. The tunable, optical metasurface may include 1,000 electrical contacts. Each electrical contact may be connected to one rail within each subset. Thus, in the examples above, each of the 1,000 electrical contacts would be connected to 50 different metal rails—one metal rail in each of the 50 subsets.

Liquid crystal deposited between the metal rails may be secured via an optically transparent cover (e.g., glass). The application of a voltage pattern to the 1,000 electrical contacts via a voltage controller results in a voltage differential bias pattern being applied to the liquid crystal that changes the local reflection phase thereof. A beam steering controller selects a voltage pattern corresponding to a reflection phase pattern of a target beam steering angle. By modifying the applied voltage, incident optical radiation can be steered in one direction. Similar embodiments using columns or pillars instead of elongated metal rails may be used to allow for two-dimensional beam steering or spatial beamforming.

It is appreciated that the metasurface technologies described herein may incorporate, enhance, or otherwise complement prior advancements in surface-scattering antennas, such as those described in U.S. Patent Publication No. 2012/0194399, which publication is hereby incorporated by reference in its entirety. Additional elements, applications, and features of surface-scattering antennas that feature a reference wave or feed wave are described in U.S. Patent Publication Nos. 2014/0266946, 2015/0318618, 2015/0318620, 2015/0380828, 2015/0162658, and 2015/0372389, each of which is hereby incorporated by reference in its entirety. Specific descriptions of optical resonant antenna configurations and feature sizes are described in U.S. patent application Ser. Nos. 16/357,288, 15/900,676, 15/900,683, and 15/924,744, each of which is hereby incorporated by reference in its entirety to the extent they are not inconsistent herewith.

Many prior advancements in surface-scattering antennas have focused on relatively low frequencies (e.g., microwave or other radio frequency bands). The presently described embodiments support optical bandwidths and are therefore suitable for lidar and other optical-based sensing systems. For example, the optical systems and methods described herein operate in the sub-infrared, mid-infrared, high-infrared, and/or visible-frequency ranges (generally referred to herein as "optical"). Given the feature sizes needed for subwavelength optical resonant antennas and antenna spacings, the described metasurfaces and/or arrays of detector elements may be manufactured using microlithographic and/or nanolithographic processes, such as fabrication methods commonly used to manufacture complementary metal-oxide-semiconductor (CMOS) integrated circuits.

Many of the examples illustrated and described herein refer to optical metasurfaces and, more specifically, to optically reflective tunable metasurfaces. However, it is appreciated that the presently described systems and methods are equally applicable to other types of metasurfaces, including reflective and transmissive metasurfaces configured for use with optical radiation, microwave radiation, RF radiation, and/or other specific bands of electromagnetic radiation. Similarly, the presently described systems and methods may be used in conjunction with tunable (e.g., reconfigurable) metasurfaces and/or static metasurfaces.

Thus, the presently described systems and methods are generally understood to encompass a wide variety of metasurface antenna systems, including RF antenna systems and optical antenna systems, such as lidar systems. Variations and specific embodiments encompassed by the preceding general description may incorporate tunable metasurface devices adapted for specific bands of electromagnetic radiation.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc., that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as an application-specific integrated circuit (ASIC), programmable array logic (PAL), programmable logic array (PLA), a programmable logic device (PLD), a field-programmable gate array (FPGA), and/or another customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once.

As previously noted, descriptions and variations described in terms of transmitters are equally applicable to receivers, and vice versa.

As generally described in conjunction with the figures below, the solid-state optical transceiver system includes a transmitter and a receiver. The transmitter may include a laser assembly and optical assembly to generate optical radiation incident on a tunable, optically reflective metasurface. A controller (e.g., microcontroller, processor, microprocessor, control circuitry, control logic, etc.) may tune the optically reflective metasurface to transmit the optical radiation as a transmit scan line at a transmit steering angle, as described herein. The receiver may be implemented as a steering receiver or as a staring receiver. Embodiments utilizing a steering receiver may include another tunable, optically reflective metasurface to steerably receive optical radiation as receive scan lines at receive steering angles corresponding to the transmit steering angles. A steering receive may also include various optical elements, such as mirrors, lenses, filters, and the like. Embodiments utilizing a staring receiver do not utilize a tunable, optically reflective metasurface on the receiver side, but do include various optical lenses, mirrors, and/or filters.

FIG. 1 illustrates an example block diagram of a tunable liquid crystal metasurface (LCM) 153 that can be used as part of the transmit subsystem of a solid-state optical transceiver system, according to various embodiments described herein. As illustrated, the tunable LCM 153 includes an optically reflective substrate 190 and a dielectric layer 195. A plurality of elongated optical resonant antennas 191 may be arranged at sub-wavelength intervals on the optically reflective substrate 190. Liquid crystal 193 may be positioned between the elongated optical resonant antennas 191. A controller (not illustrated) may apply voltage differential bias patterns to the liquid crystal within the optical field regions of at least some of the elongated optical resonant antennas 191 to modify the reflection phase of the tunable LCM 153 to adjust the steering angle of the transmit scan line 155 of optical radiation. In embodiments utilizing a steering receiver, the receiver subsystem may include a tunable LCM 153 to steerably receive optical radiation rebounded from distant objects.

FIG. 2A illustrates an example block diagram of a top view of the optical paths (shown in dashed lines) of an example transmitter subsystem 211 and an example steering receiver subsystem 251, according to one embodiment. As illustrated, the transmitter subsystem 211 may include a laser assembly 210 to transmit optical radiation through collimating optics 220 to an LCM 230. The LCM 230 is steered to discrete transmit steering angles, $\varphi$, as a scan line with an elevation beam height corresponding to a fixed angle, $\ominus$. The receiver subsystem 251 includes an N×M detector array 250, where N and M are integer values. Optical radiation rebounded from distant objects (dashed lines) is received by the LCM 270 and steerably reflected to the receiver optical elements 260, where the optical radiation is then focused onto the plane of the N×M detector array 250.

FIG. 2B illustrates an example block diagram of a side view of the optical paths of the example transmitter subsystem 211 and the example steering receiver subsystem 251 of FIG. 2A. Again, the laser assembly 210 transmits optical radiation through collimating optics 220 for steerable transmission by the LCM 230. In some embodiments, the collimating optics 220 may be a part of a transmit optical element assembly that includes one or more additional optical elements. For example, a transmit optical element assembly may include one or more collimating optical elements to collimate the optical radiation along a steering axis of the transmit metasurface and/or one or more diverging optical elements to fan the optical radiation perpendicular to the steering axis of the transmit metasurface.

The transmitted optical radiation is steerably received by the LCM 270 of the receiver and reflected through the receiver optics 260 for reception by the detector array 250. In various embodiments, the receiver optical elements may include various lenses and/or mirrors. The receiver subsystem 251 may include a bandpass filter tuned to pass optical radiation having the same wavelength(s) as the optical radiation transmitted by the laser assembly 210. The bandpass filter may be positioned between the receiver optics 260 and the LCM 270, as illustrated. Alternatively, the bandpass filter may be positioned between the detector array 250 and the receiver optical elements 260 or between the LCM 270 and the distant objects. In some embodiments, the bandpass filter may be integrated as a layer of the LCM 270.

FIG. 2C illustrates an example block diagram of the instantaneous scan line 298 and the entire field of view 295 of solid-state transceiver system utilizing the example transmitter subsystem 211 and the example steering receiver subsystem 251 of FIGS. 2A and 2B. As illustrated, the entire field of view 295 can be described in terms of an angle of elevation, e. The resolution in the elevation direction (vertical) corresponds to the number of detector elements in the elevation dimension of the N×M detector array 250 (FIG. 2A). Each instantaneous scan line 298 captures a vertical scan line spanning the entire elevation of the field of view. The resolution in the scanning direction (horizontal) corresponds to the incremental scanning or steering resolution in the $\varphi$ direction. Additional embodiments and variations of staring and steering receiver configurations are described herein, as well as receiver subsystems utilizing one-dimensional and two-dimensional arrays of detector elements.

FIG. 2D illustrates azimuth scanning via a solid-state transceiver that includes a transmitter subsystem 210 and a receiver subsystem 251, according to one embodiment. A first scan line 288 illuminates distant objects along a first, one-dimensional scan line 288 (dark shading) of the entire field of view 295. At least some of the optical radiation is reflected or bounced back from distant objects within the first scan line 288 portion of the entire field of view 295 and received by the receiver subsystem 251. In the illustrated embodiment, the receiver subsystem 251 utilizes a staring receiver architecture. In other embodiments, the receiver subsystem 251 may be configured as a steering receiver instead, as described herein. The optical radiation received from objects illuminated by the first scan line 288 is focused to a column of detector elements.

Time-of-flight calculations (e.g., indirect and/or direct time-of-flight calculations) can be used to determine the distance to each object within the portion of the entire field of view 295 that was illuminated by the first scan line 288. The time-of-flight calculations associated with the first scan line illumination are received and mapped to a corresponding column of a time-of-flight imaging output. In embodiments in which the receiver subsystem 251 includes a two-dimensional array of detector elements, one or more columns of the detector element array may be used to receive rebounded optical radiation from a corresponding transmit scan line and to generate a corresponding column of a time-of-flight imaging output.

FIG. 2E illustrates an example timeline of the discrete steering, collecting, and readout processes for the azimuth scanning by the solid-state transceiver of FIG. 2D, according to one embodiment. As illustrated, the LCM of the transmitter subsystem 211 may be steered to a first steering angle, $\varphi_1$. The laser assembly of the transmitter subsystem 211 illuminates a first vertical scan line of the entire field of view for a discrete amount of time while the LCM remains steered to the first steering angle, $\varphi_1$. The receiver subsystem 251 receives rebounded optical radiation for a discrete amount of time and calculates time-of-flight information to determine the distance to objects within the first illuminated column of the field of view that corresponds to the first steering angle, $\varphi_1$.

The LCM is then steered to a second steering angle, $\varphi_2$. As illustrated, the receiver may read out information from each receiver column while the transmitter LCM is being steered to a new steering angle. The laser assembly of the transmitter subsystem 211 illuminates a second vertical scan line 289 of the entire field of view 295 for a discrete amount of time while the LCM remains steered to the second steering angle, $\varphi_2$. The receiver subsystem 251 receives rebounded optical radiation for a discrete amount of time and calculates time-of-flight information to determine the distance to objects within the second illuminated column of the field of view that corresponds to the second steering angle, $\varphi_2$. The LCM is then steered to a third steering angle, $\varphi_3$.

FIG. 3 illustrates an embodiment of a solid-state transceiver system 300 to implement one-dimensional transmit and receive scanning. A transmitter includes a tunable, optically reflective metasurface that transmits a transmit scan line 326 at a transmit steering angle along an azimuth 390 in the far-field represented by a grid 350. The transmit scan line 326 may have an elevational beam height between 15 and 120 degrees along an elevation 395 of the grid 350 and a relatively narrow beam linewidth between 0.01 and 5 degrees.

Optical radiation 327 reflected from objects in the far-field may be reflected back at a corresponding receive steering angle to be detected by detector elements as a steerable receive scan line. In the steerable receiver embodiment (i.e., a steering receiver), a tunable, optically reflective metasurface may steerably receive the reflected optical radiation 327 and direct it to a one-dimensional array of detector elements 328

Figure 4A:
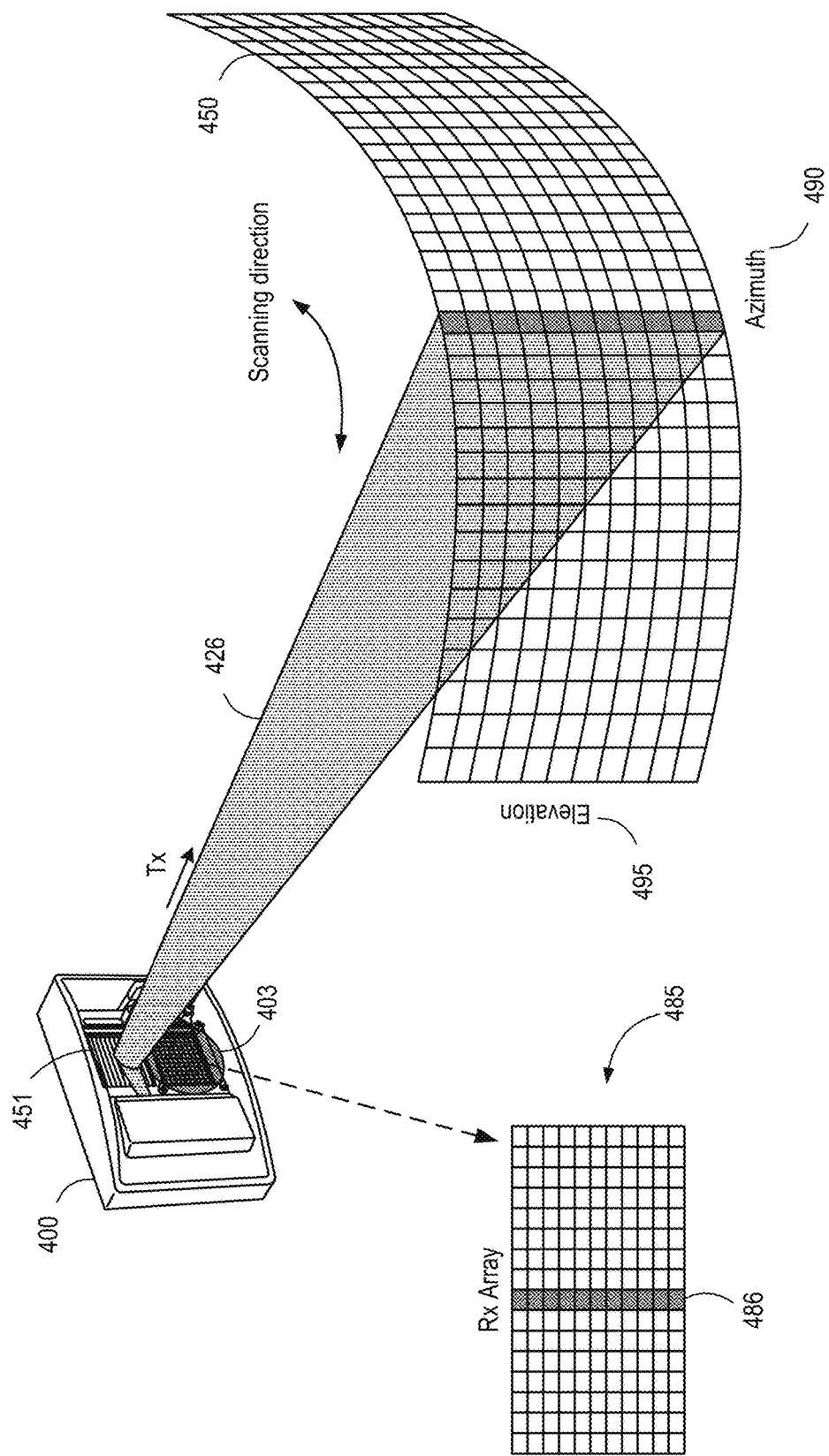
FIG. 4A illustrates another embodiment of a solid-state transceiver system with a two-dimensional array of receive elements for detection, according to one embodiment.

FIG. 4A illustrates another embodiment of a solid-state transceiver system 400 that utilizes a staring receiver architecture in which a two-dimensional array 485 of detector elements is used for detection instead of a tunable, optically reflective metasurface (as in FIG. 3), according to one embodiment. The solid-state transceiver system 400 may include a tunable, optical metasurface 451 to transmit a transmit scan line 426 of optical radiation to objects in the far-field, represented by the grid 450. The transmit scan line 426 may have a fixed beam height along the elevation 495 and be one-dimensionally steered along the azimuth 490.

The solid-state transceiver system 400 may include receiver optics 403 to direct received optical radiation from each of a plurality of receive scan angles to a unique column of detector elements in the two-dimensional array 485 of the detector elements. For example, the receiver optics 403 may direct optical radiation incident at a receive scan angle corresponding to the illustrated transmit scan angle to the shaded column 486 of detector elements in the two-dimensional array 485. Thus, as the transmit scan line 426 is swept along the azimuth 490, a receiver may sweep detection along the columns of the two-dimensional array 485. The receiver optics 403 may, for example, include one or more lenses, mirrors, or filters. For example, in some embodiments, a bandpass filter may be included as part of the receiver optics, as described herein.

Figure 4B:
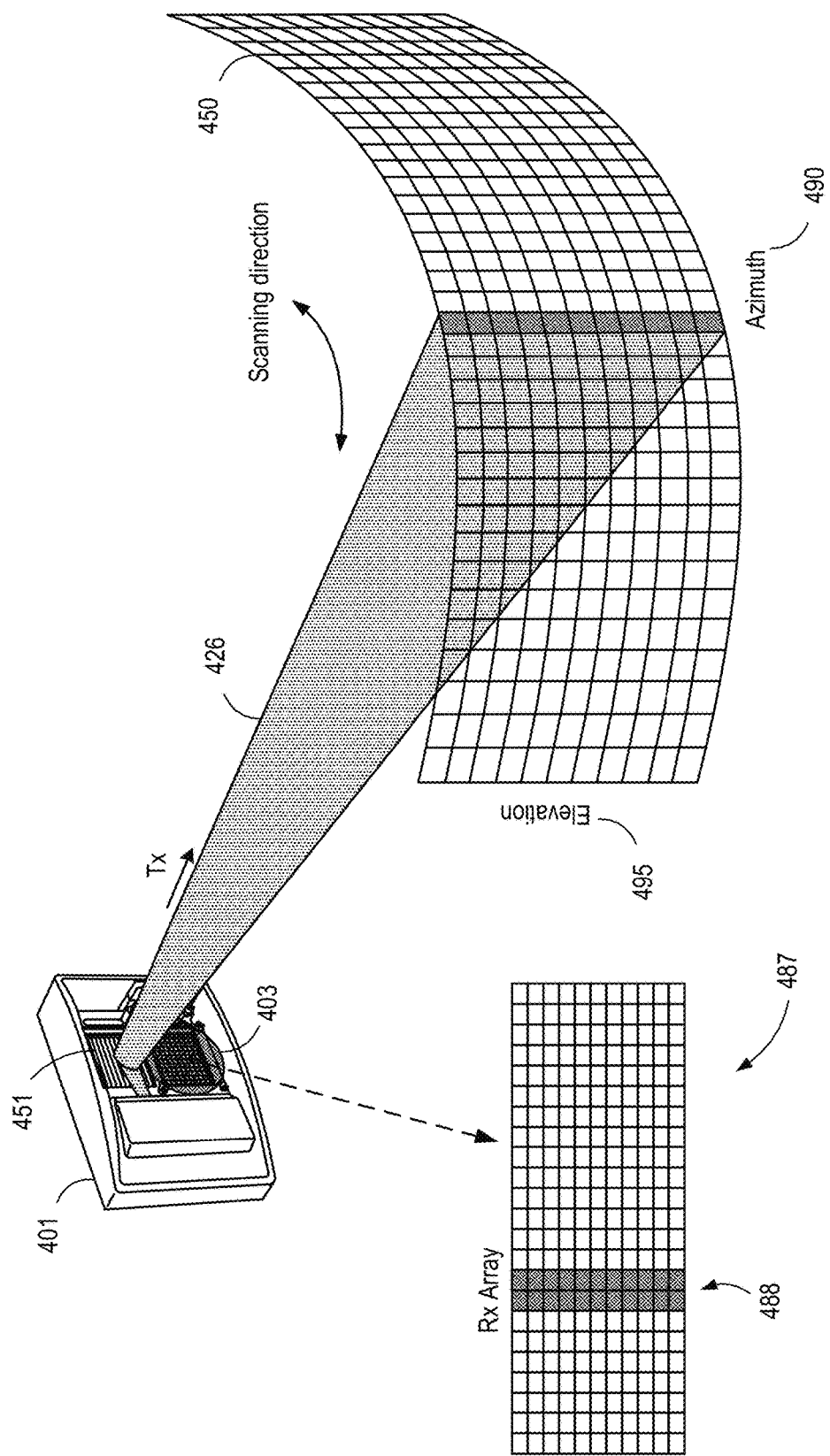
FIG. 4B illustrates another embodiment of a solid-state transceiver system with a two-dimensional array of receive elements, according to one embodiment.

FIG. 4B illustrates another embodiment of a solid-state transceiver system 401 that utilizes a staring receiver architecture in which a two-dimensional array 487 of detector elements is used for detection instead of a tunable, optically reflective metasurface (as in FIG. 3), according to one embodiment. The solid-state transceiver system 401 may include a tunable, optical metasurface 451 to transmit a transmit scan line 426 of optical radiation to objects in the far-field, represented by the grid 450. The transmit scan line 426 may have a fixed beam height along the elevation 495 and be one-dimensionally steered along the azimuth 490.

The solid-state transceiver system 401 may include receiver optics 403 to direct received optical radiation from each of a plurality of receive scan angles to a plurality of columns of detector elements in the two-dimensional array 487 of the detector elements. For example, the receiver optics 403 may direct optical radiation incident at a receive scan angle corresponding to the illustrated transmit scan angle to the shaded columns 488 of detector elements in the two-dimensional array 485. Thus, as the transmit scan line 426 is swept along the azimuth 490, a receiver may sweep detection along sets of one or more columns of the two-dimensional array 487.

Figure 5:
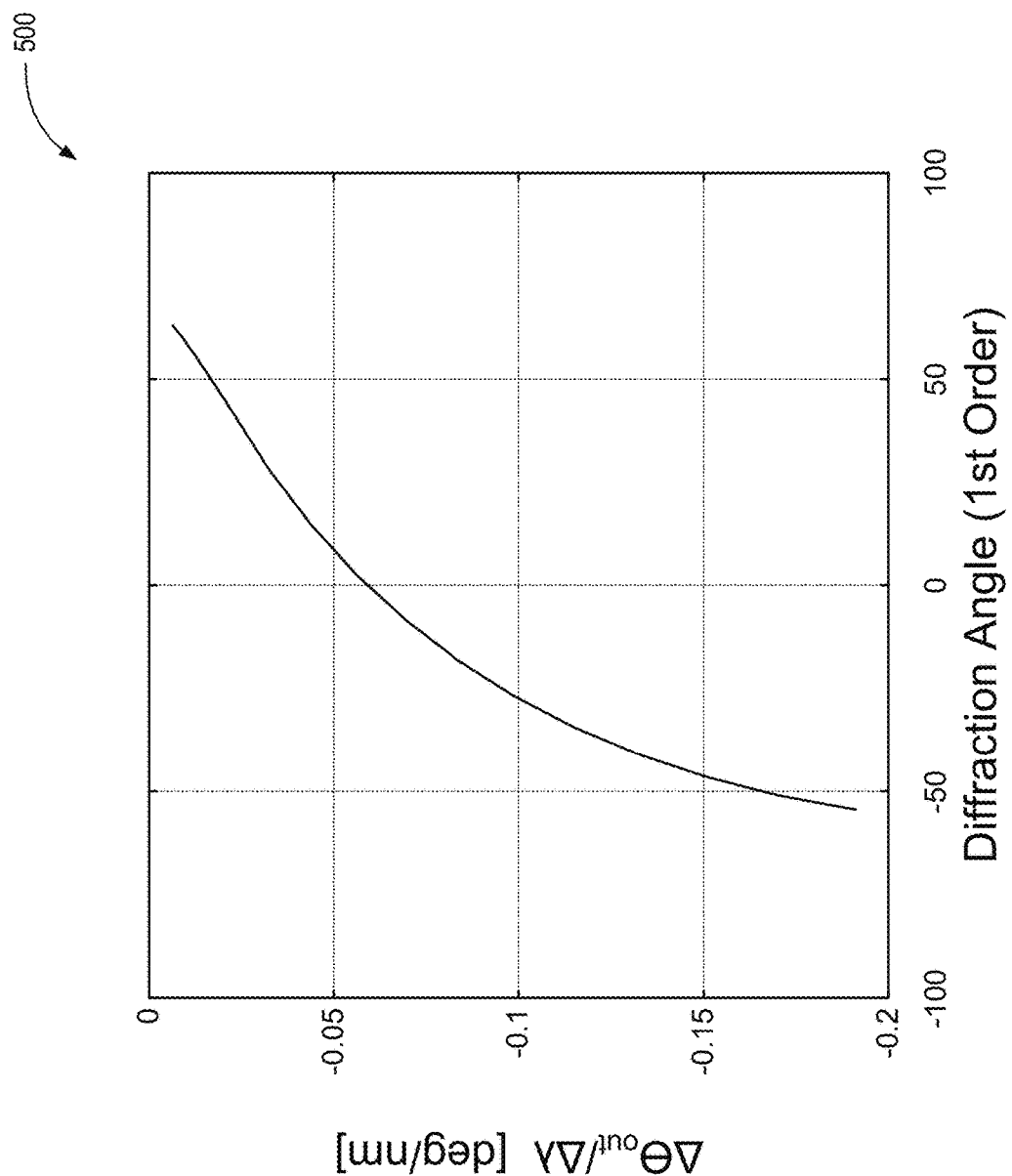
FIG. 5 illustrates a graph of optical divergence of optical radiation of a given linewidth with respect to diffraction angle, according to one embodiment.

FIG. 5 illustrates a graph 500 of optical divergence of optical radiation of a given linewidth with respect to diffraction angle, according to one embodiment. Beam steering by optical metasurfaces is inherently dispersive for a given bandwidth of optical radiation. For example, an optical metasurface may exhibit slightly different steering angles for deviations from the given wavelength. As illustrated, a five-nanometer linewidth of optical radiation may exhibit approximately one degree of divergence at a negative 60-degree steering angle. Accordingly, a narrower bandwidth of optical radiation may decrease the linewidth of the transmit scan line, increase the possible maximum resolution of the system, and/or decrease the signal-to-noise ratio (SNR) of received optical radiation. The optical assembly may include a feedback element, such as a volume Bragg grating element, to lock the lasers of the laser assembly (e.g., via injection seeding, reverse-reflection seeding, and/or the like).

FIG. 6 illustrates an example of an optical feedback element 625 to narrow the linewidth of the optical radiation source 610, according to one embodiment. The optical radiation source 610 may comprise one or more lasers that are lockable to narrow a linewidth of the emitted optical radiation. In an unlocked state, the optical radiation source 610 may generate optical radiation having a linewidth between 2 and 10 nanometers. For example, the optical radiation source 610 may comprise a 905-nanometer laser assembly to generate optical radiation in an unlocked state with a first linewidth 675 (dashed line) on graph 670 showing the magnitude of various wavelengths of the optical radiation.

One or more lenses 615 and an optical feedback element 625 (e.g., a volume Bragg grating element) may lock the optical radiation source 610 with 905-nanometer optical radiation. For instance, a volume Bragg grating element may return a narrow linewidth of optical radiation 626 back to the optical radiation source 610. Once locked, the 905-nanometer optical radiation source 610 generates optical radiation with a narrower linewidth 677 (solid line). As described above, the narrower linewidth 677 of the optical radiation from the locked optical radiation source 610 reduces the dispersivity at various transmit steering angles to increase the possible resolution of the system and/or decrease the SNR at a given steering angle.

Figure 7A:
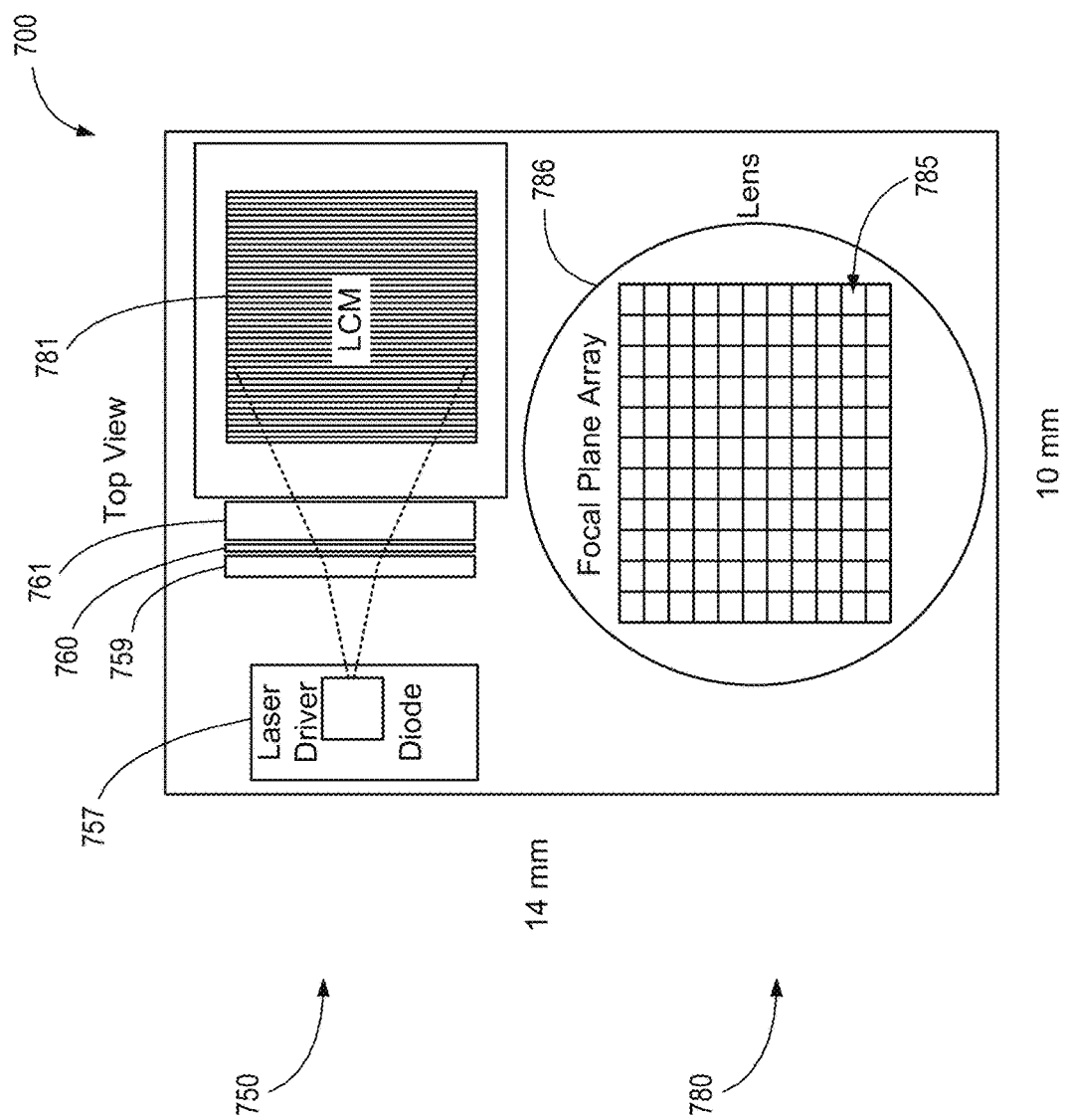
FIG. 7A illustrates a top-down view of an example layout of a solid-state transceiver system with a transmitter with incident optical radiation perpendicular to rails of a tunable LCM, according to one embodiment.

FIG. 7A illustrates a top-down view of an example layout of a solid-state transceiver system 700 with a transmitter 750 in which incident optical radiation is received perpendicular to the rails of a tunable LCM 781, according to one embodiment. The specific example solid-state transceiver system 700 has a width of approximately 10 millimeters and a length of approximately 14 millimeters. The transmitter 750 includes a laser assembly 757 that includes one or more laser drivers and diode lasers to generate optical radiation. The generated optical radiation is refracted by optical elements, including a lens 759, a volume Bragg grating element 760, and a prism 761 for collimation on the tunable LCM 781. As described herein, the volume Bragg grating element 760 may lock the laser assembly 757 to lock in a narrower linewidth to decrease the dispersivity of transmit scan lines.

The receiver 780 may include receiver optics 786 (e.g., one or more lenses) over a two-dimensional array 785 of detector elements. Each column of detector elements in the two-dimensional array 785 of detector elements may form a receive scan line. The receiver optics 786 may map optical radiation received from each discrete receive scan angle to a unique receive scan line of detector elements (i.e., a single column of detector elements). In some embodiments, multiple columns of detector elements may map to a single receive scan line. In such embodiments, the receiver optics 786 may map optical radiation received from each discrete receive scan angle to a unique receive scan line of detector elements, where the unique receive scan line comprises multiple columns of detector elements.

Figure 7B:
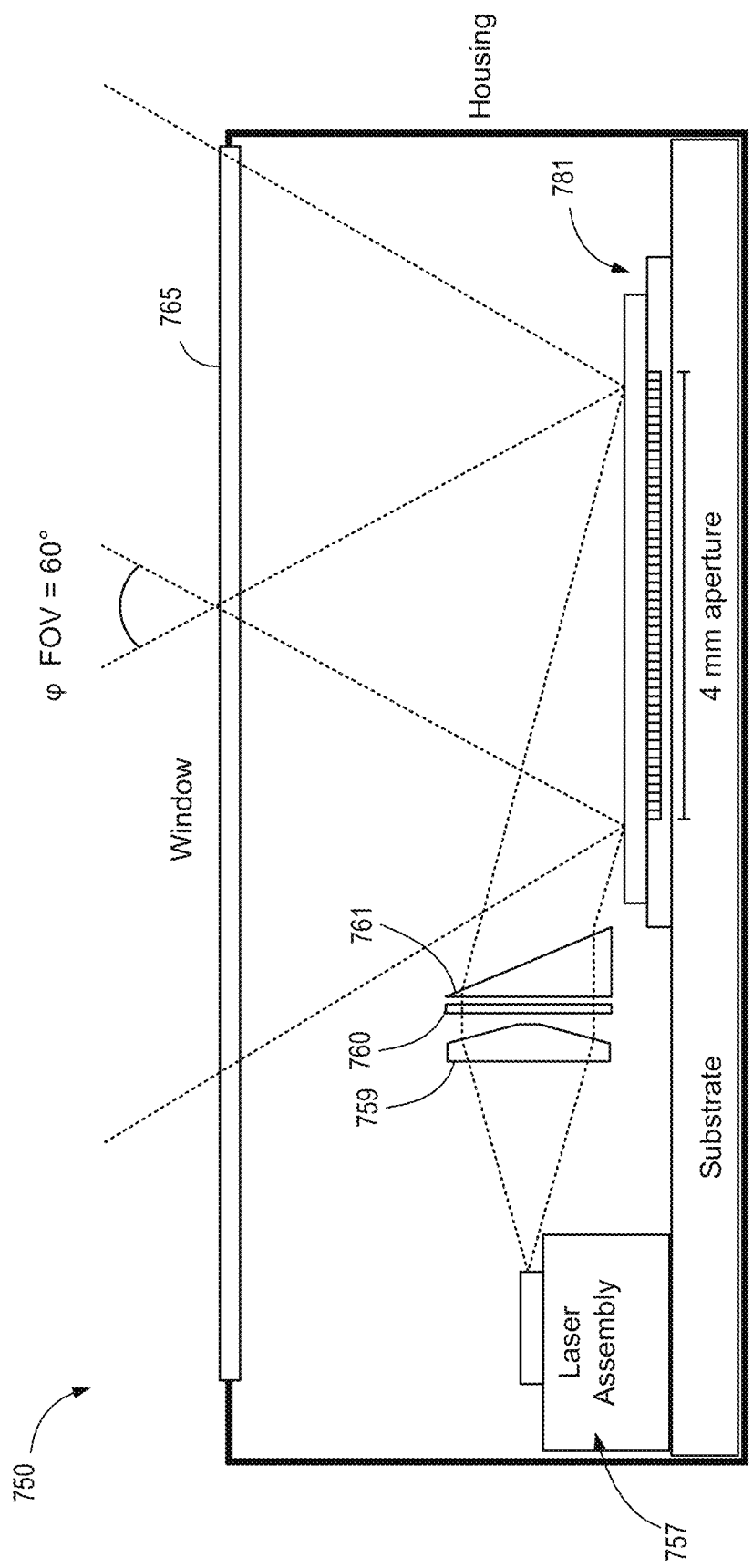
FIG. 7B illustrates a side view of the example layout of the transmitter of the solid-state transceiver system, according to one embodiment.

FIG. 7B illustrates a side view of the example layout of the transmitter 750 of the solid-state transceiver system of FIG. 7A, according to one embodiment. As illustrated, the laser assembly 757 may include one or more drivers and lasers to generate optical radiation (illustrated as dashed lines) that passes through the lens 759, the volume Bragg grating element 760, and prism 761 and is ultimately incident on a tunable LCM 781. The tunable LCM 781 may steerably reflect the optical radiation as a transmit scan line at a selected transmit steering angle. In the illustrated example, the optical radiation can be steered with a field-of-view (FOV) of approximately 60 degrees through a window 765. The example dimensions in the drawing may be utilized in some applications, but alternative dimensions and configurations may be utilized in different applications.

Figure 7C:
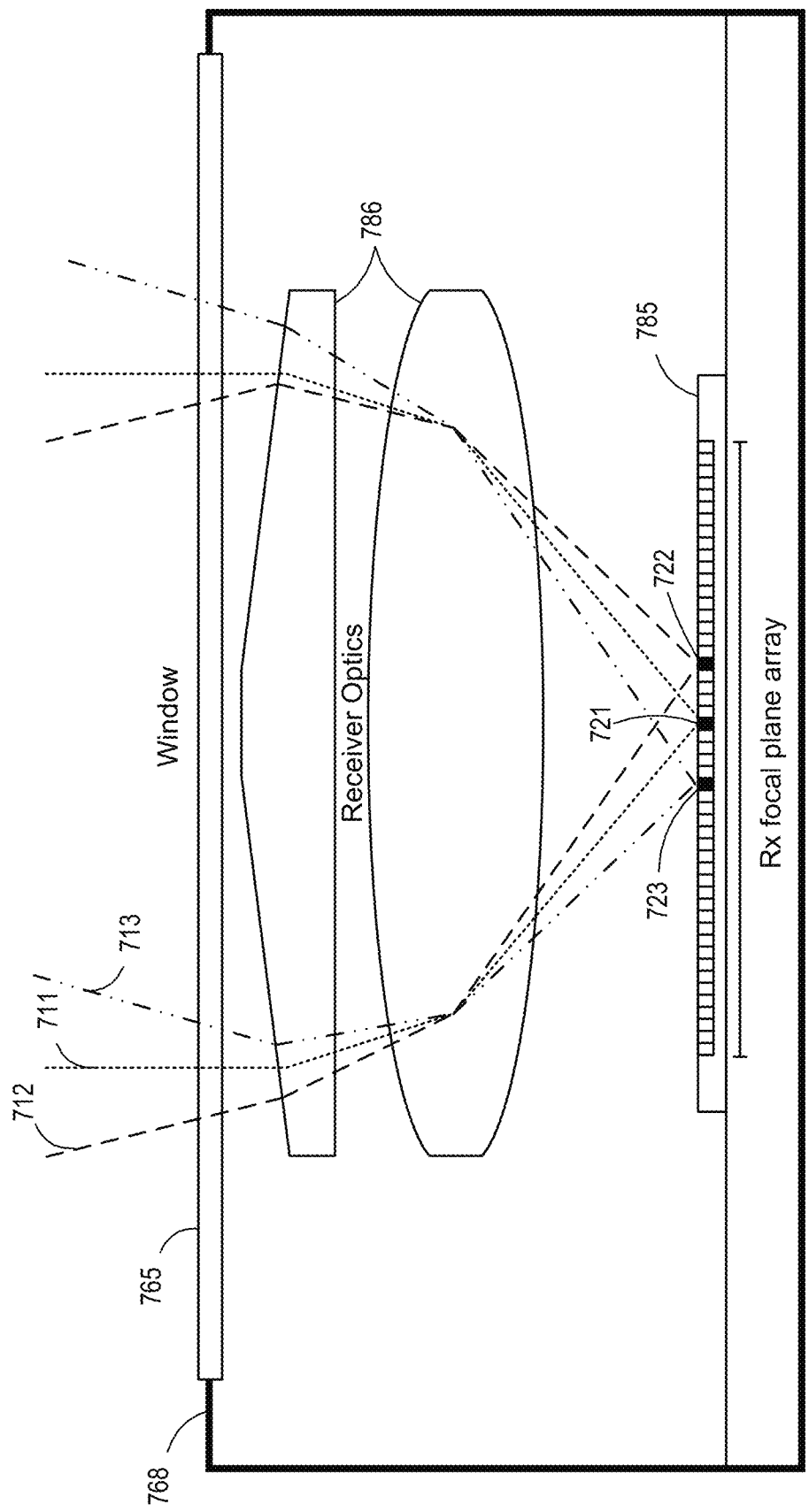
FIG. 7C illustrates a side view of the example layout of the two-dimensional array receiver of the solid-state transceiver system, according to one embodiment.

FIG. 7C illustrates a side view of the example layout of the receiver of the solid-state transceiver system of FIG. 7A with a two-dimensional array 785, according to one embodiment. The optical radiation may enter an enclosure 768 via a window 765. Receiver optics 786 may direct optical radiation from discrete receive steering angles to unique receive scan lines (e.g., columns of detector elements) of the two-dimensional array. In the example embodiment, optical radiation 711 (illustrated as a dotted line) at a zero-degree steering angle is directed to a first receive scan line 721 of detector elements. Optical radiation 712 (illustrated as a dashed line) at a negative steering angle is directed to a second receive scan line 722 of detector elements. Optical radiation 713 (illustrated as a dashed and dotted line) at a positive steering angle is directed to a third receive scan line 723 of detector elements.

Figure 8A:
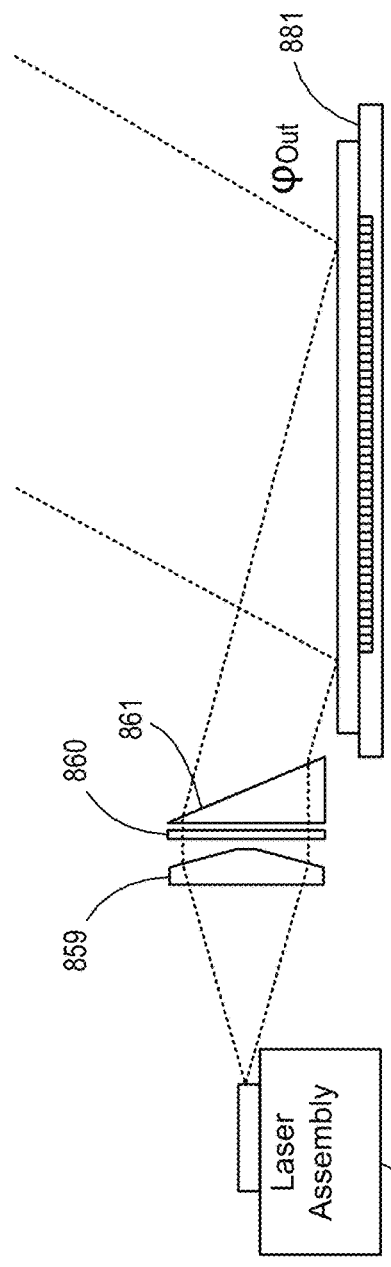
FIG. 8A illustrates an optical path of an example transmitter of a solid-state transceiver system, according to one embodiment.

FIG. 8A illustrates an optical path of an example transmitter of a solid-state transceiver system, according to one embodiment. A laser assembly 857 may generate optical radiation incident on a tunable, optically reflective metasurface 881 after passing through an optical assembly illustrated as including a plano-convex lens 859, a volume Bragg grating element 860, and a prism 861. The optical radiation may be incident on the optically reflective metasurface 881 perpendicular to elongated optical resonant antennas of the optically reflective metasurface 881.

Figure 8D:
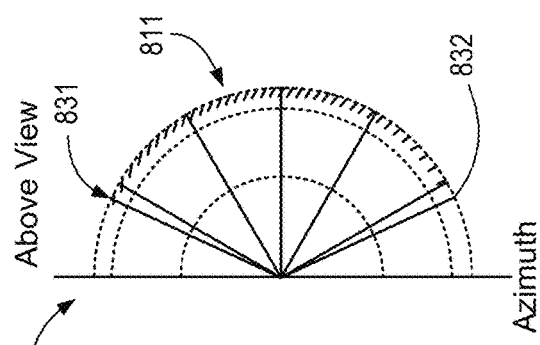
FIG. 8D illustrates a top-down view of the one-dimensional azimuth scanning, according to one embodiment.
Figure 8C:
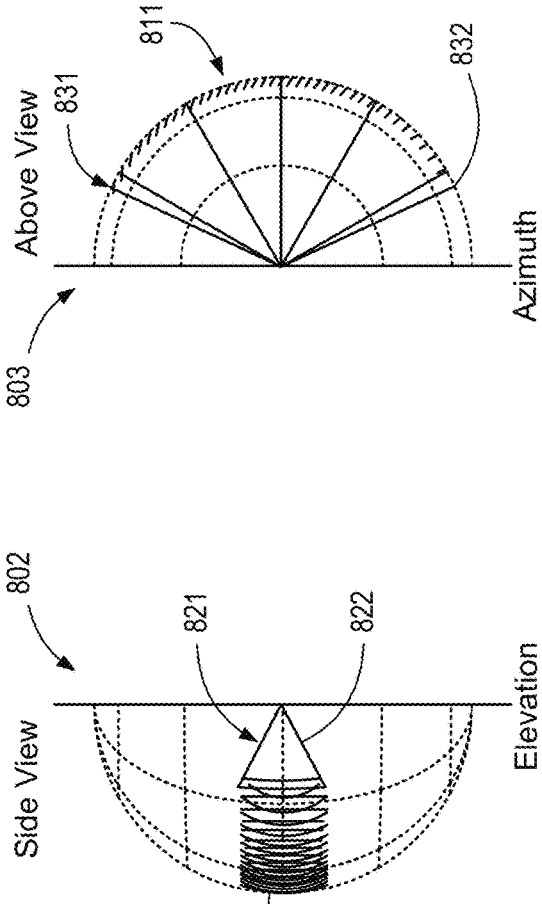
FIG. 8C illustrates a side view of the one-dimensional azimuth scanning, according to one embodiment.
Figure 8B:
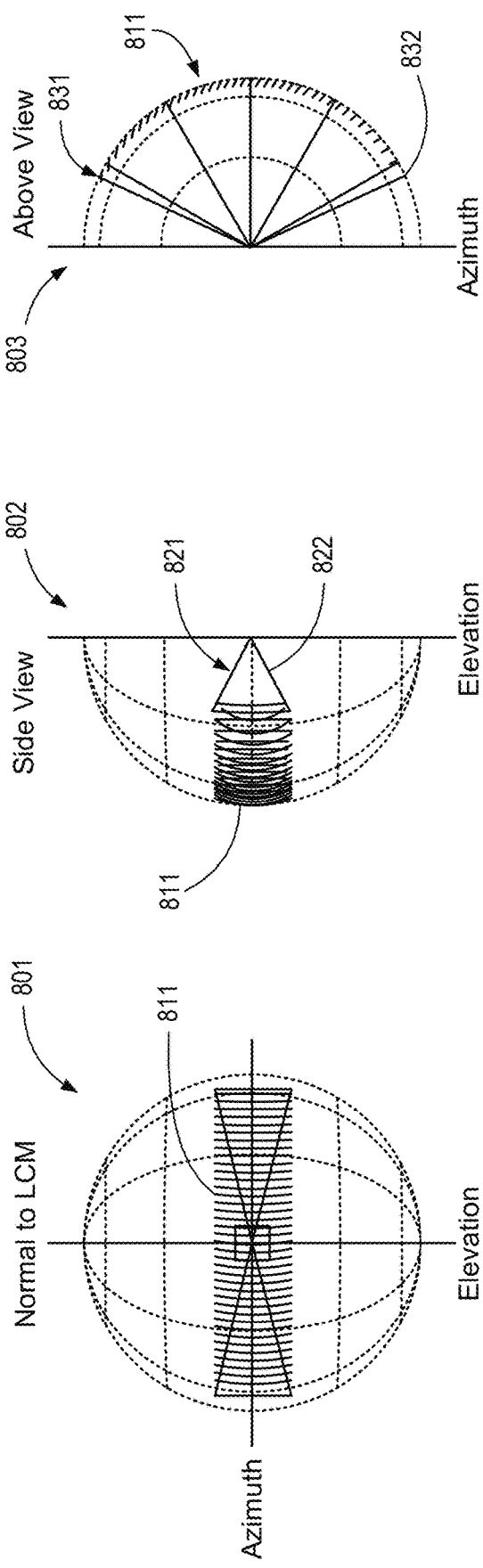
FIG. 8B illustrates one-dimensional azimuth scanning of transmitted optical radiation, according to one embodiment.

FIG. 8B illustrates a graph 801 of one-dimensional azimuth scanning of transmitted optical radiation, according to one embodiment. As illustrated, the transmit scan lines 811 are asymmetrically curved with respect to negative steering angles on the left half of the graph and positive steering angles on the right half of the graph due to conical diffraction from the tunable, optically reflective metasurface.

FIG. 8C illustrates a side view graph 802 of the one-dimensional azimuth scanning of FIG. 8B with scan lines 811 having an elevational height at an angle between lines 821 and 822, according to one embodiment.

FIG. 8D illustrates a top-down view graph 803 of the one-dimensional azimuth scanning of FIG. 8B with transmit scan lines 811 steered between a first steering angle 831 and a second steering angle 832, according to one embodiment.

Figure 8E:
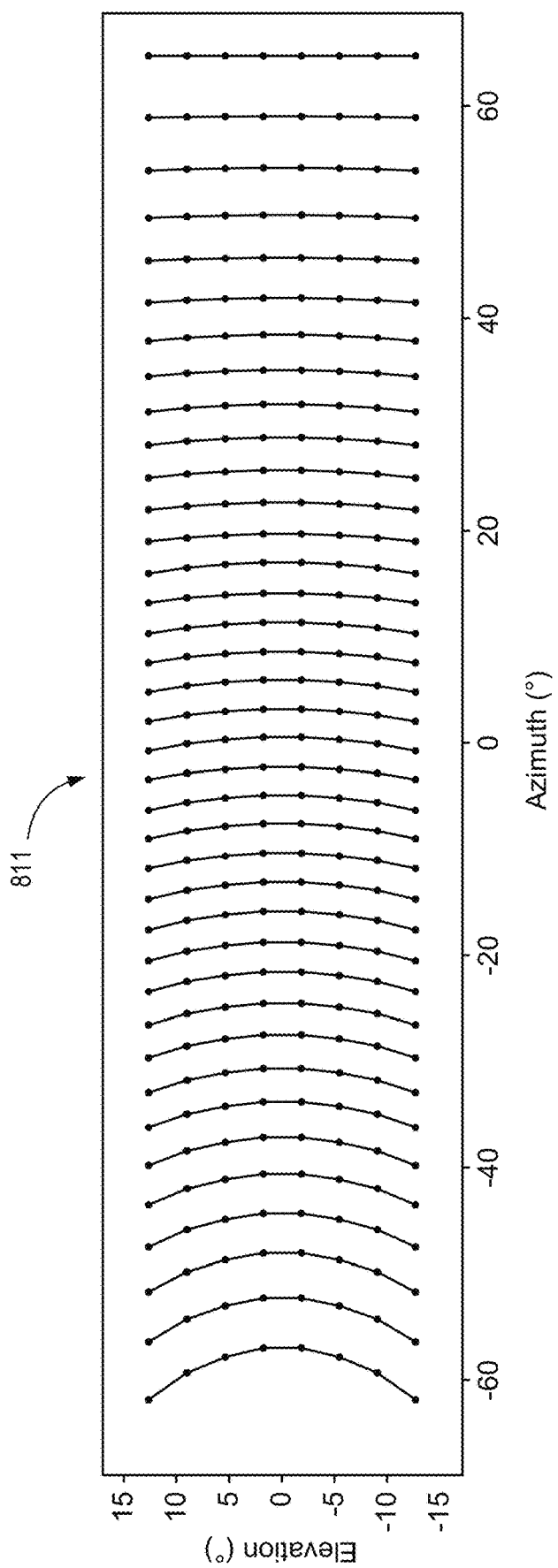
FIG. 8E illustrates the asymmetrical diffractive curvature of the optical radiation at negative steering angles for the transmitter, according to one embodiment.

FIG. 8E illustrates the asymmetrical diffractive curvature of the optical radiation transmit scan lines 811 at negative steering angles for the transmitter of FIG. 8A due to conical diffraction from the LCM, according to one embodiment. As described herein, in some embodiments the optical radiation from the laser assembly may pass through one or more optical elements to shape, distort, or deform the optical radiation for some steering angles to generate a symmetrical diffractive curvature instead. For example, the optical elements may cause the transmit scan lines 811 at positive steering angles to mirror the transmit scan lines 811 at negative steering angles. In still other embodiments, the one or more optical elements may shape, distort, or deform the optical radiation to correct for the curvature such that all of the transmit can lines 811 are straight.

Figure 8F:
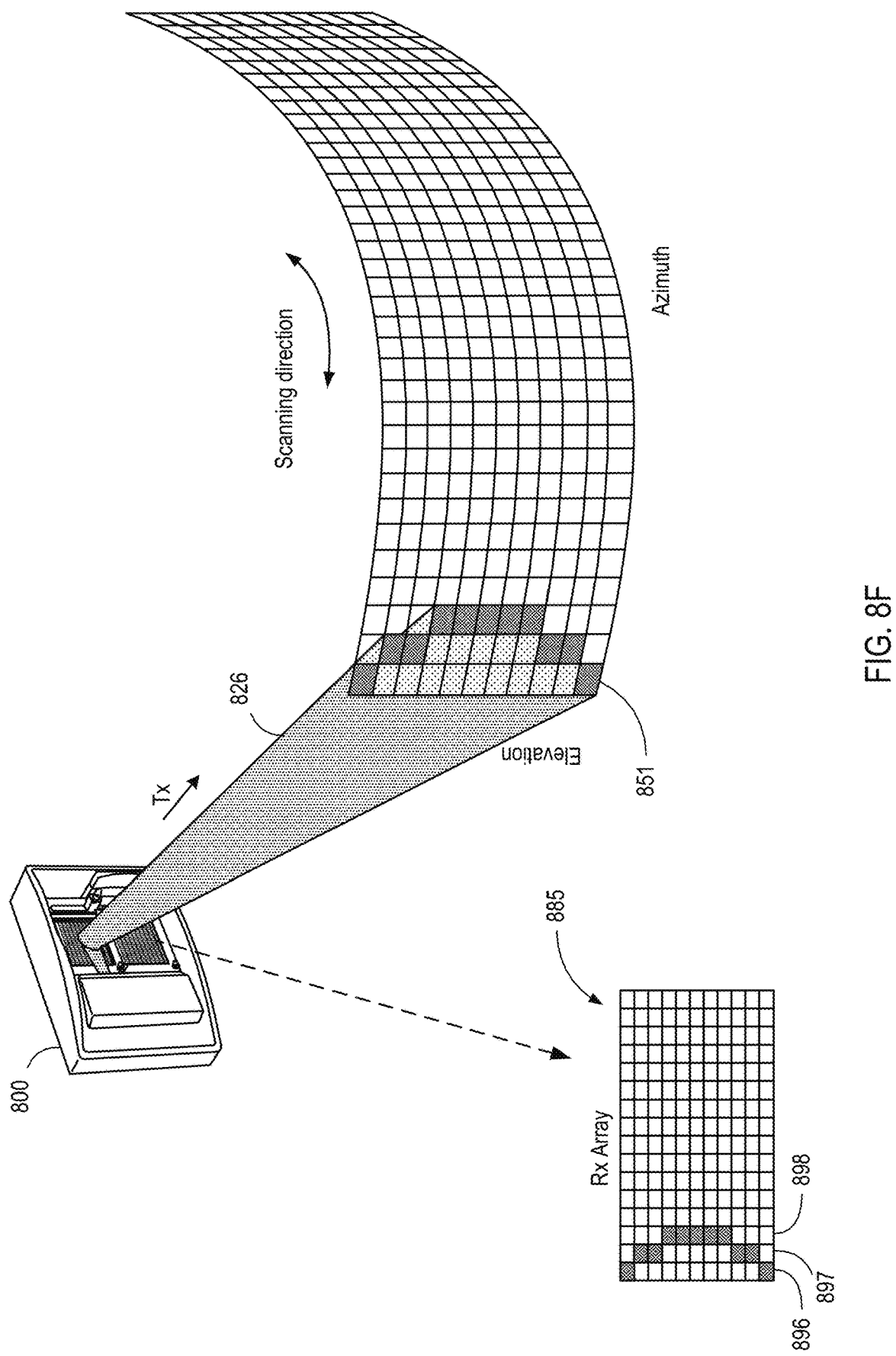
FIG. 8F illustrates azimuth scanning via a solid-state transceiver system with a transmitter at a positive steering angle, according to one embodiment.

FIG. 8F illustrates azimuth scanning via a solid-state transceiver system 800 with a transmitter at a negative steering angle, according to one embodiment. At the negative steering angle, the transmitted optical radiation 826 produces a diffraction curved transmit scan line 851. The receiver of the solid-state transceiver system 800 may include a two-dimensional array 885 of detector elements. FIG. 8F also includes a zoomed-in view of the two-dimensional array 885 of detector elements. The solid-state transceiver system 800 may also include receiver optics (see e.g., FIGS. 4A, 4B, and 7C) associated with the two-dimensional array 885 to direct optical radiation from each receive steering angle to receive scan lines 896, 897, and 898 (i.e., one or more columns of detector elements).

The receiver optics may direct optical radiation from each receive steering angle to a unique receive scan line. However, because the transmit scan line 851 is curved, the controller may activate multiple receive scan lines 896, 897, and 898 to capture the optical radiation of the transmit scan line 851 reflected from distant objects. Because multiple detector elements in the receive scan lines 896-898 do not correspond to the curvature of the transmit scan line 852, the SNR of the detected optical radiation may be elevated as compared to a straight or non-curved receive scan line.

A controller may detect optical radiation reflected from the transmit scan line 851 via the receive scan lines 896, 897, and 898. The other columns of detector elements may be inactive or disabled to avoid the noise of optical radiation incident from other receive steering angles that don't correspond to the transmit steering angle associated with the diffraction curved transmit scan line 851 of the transmitted optical radiation 826.

Figure 8G:
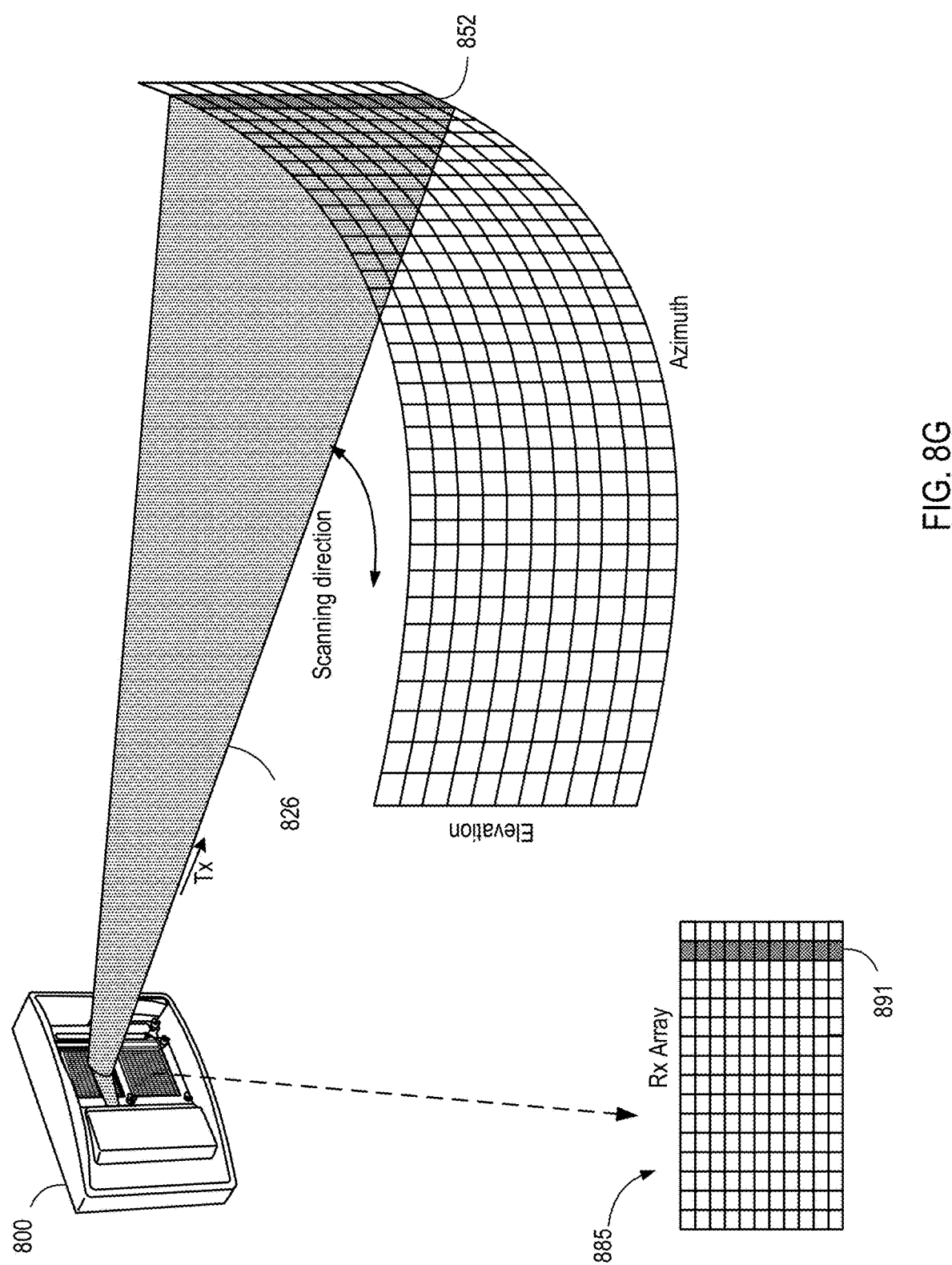
FIG. 8G illustrates azimuth scanning via a solid-state transceiver system with a transmitter and a two-dimensional array receiver at a negative steering angle, according to one embodiment.

FIG. 8G illustrates azimuth scanning via the solid-state transceiver system 800 of FIG. 8F with a transmitter at a positive steering angle, according to one embodiment. At the positive steering angle, the transmitted optical radiation 826 produces a substantially straight transmit scan line 852. FIG. 8G also includes a zoomed-in view of the two-dimensional array 885 of detector elements of the receiver of the solid-state transceiver system 800.

Again, the receiver of the solid-state transceiver system may also include receiver optics (see e.g., FIGS. 4A, 4B, and 7C) associated with the two-dimensional array 885 to direct optical radiation from each receive steering angle to a receive scan line 891 (which may include one or more columns of detector elements). The controller may detect optical radiation reflected from the transmit scan line 852 via the receive scan line 891. The other columns of detector elements may be inactive or disabled to avoid the noise of optical radiation incident from other receive steering angles that don't correspond to the transmit steering angle associated with the substantially straight scan line 852 of the transmitted optical radiation 826.

Figure 8H:
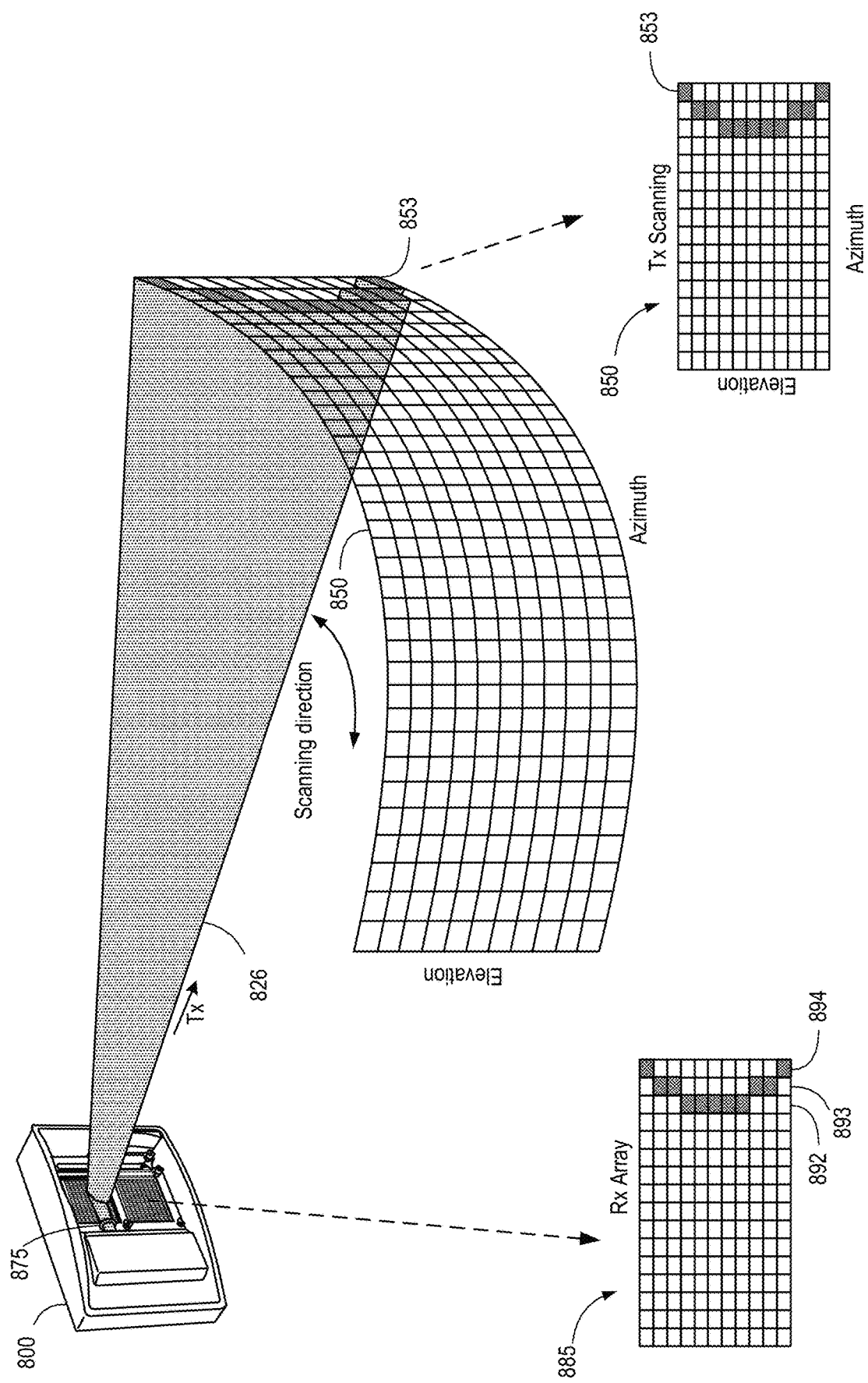
FIG. 8H illustrates azimuth scanning via the solid-state transceiver system of. with a transmitter at a negative steering angle, according to one embodiment.

FIG. 8H illustrates azimuth scanning via the solid-state transceiver system 800 of FIG. 8F with a transmitter at a negative steering angle, according to one embodiment. As previously described and illustrated in conjunction with FIGS. 8F and 8G, the transmit scan lines exhibit asymmetrical curvature between positive and negative steering angles because the optical radiation is incident on the LCM perpendicular to the rails thereof. In the illustrated embodiment, an optical element assembly 875 is positioned between the laser assembly and the transmitting LCM. The optical element assembly 875 causes the transmitted optical radiation at the positive steering angle to produce a curved transmit scan line 853 that mirrors the curved transmit scan line 851 of FIG. 8F at the negative steering angle. The curved transmit scan line 853 is shown on a flattened grid 850 on the right side of FIG. 8H to clearly illustrate the curved transmit scan line 853. FIG. 8G also includes a zoomed-in view of the two-dimensional array 885 of detector elements of the receiver of the solid-state transceiver system 800.

Receiver optics may direct optical radiation from each receive steering angle to a unique receive scan line. However, because the transmit scan line 853 is curved, the controller may activate multiple receive scan lines 892, 893, and 894 to capture the optical radiation of the transmit scan line 853 reflected from distant objects.

Since the multiple detector elements in the receive scan lines 896-898 and 892-894 do not correspond to the curvature of the transmit scan lines 851 and 853 in FIGS. 8F and 8G, the SNR of the detected optical radiation may be elevated as compared to the straight receive scan line 891 in FIG. 8G that corresponds to the straight transmit scan line 852 in FIG. 8F. Using the optical element assembly 875 shown in FIG. 8H, the diffractive curvature of the optical radiation transmit scan lines become symmetrical between positive and negative steering angles. In such embodiments, a curvature-correcting multi-element lens may be positioned above the receiver's two-dimensional array 885 to effectively straighten the optical radiation reflected by objects illuminated by the curved transmit scan lines. In such embodiments, each transmit scan line may be mapped to a single receive scan line. Each receive scan line may comprise a single column of detector elements or multiple columns of detector elements.

Figure 9A:
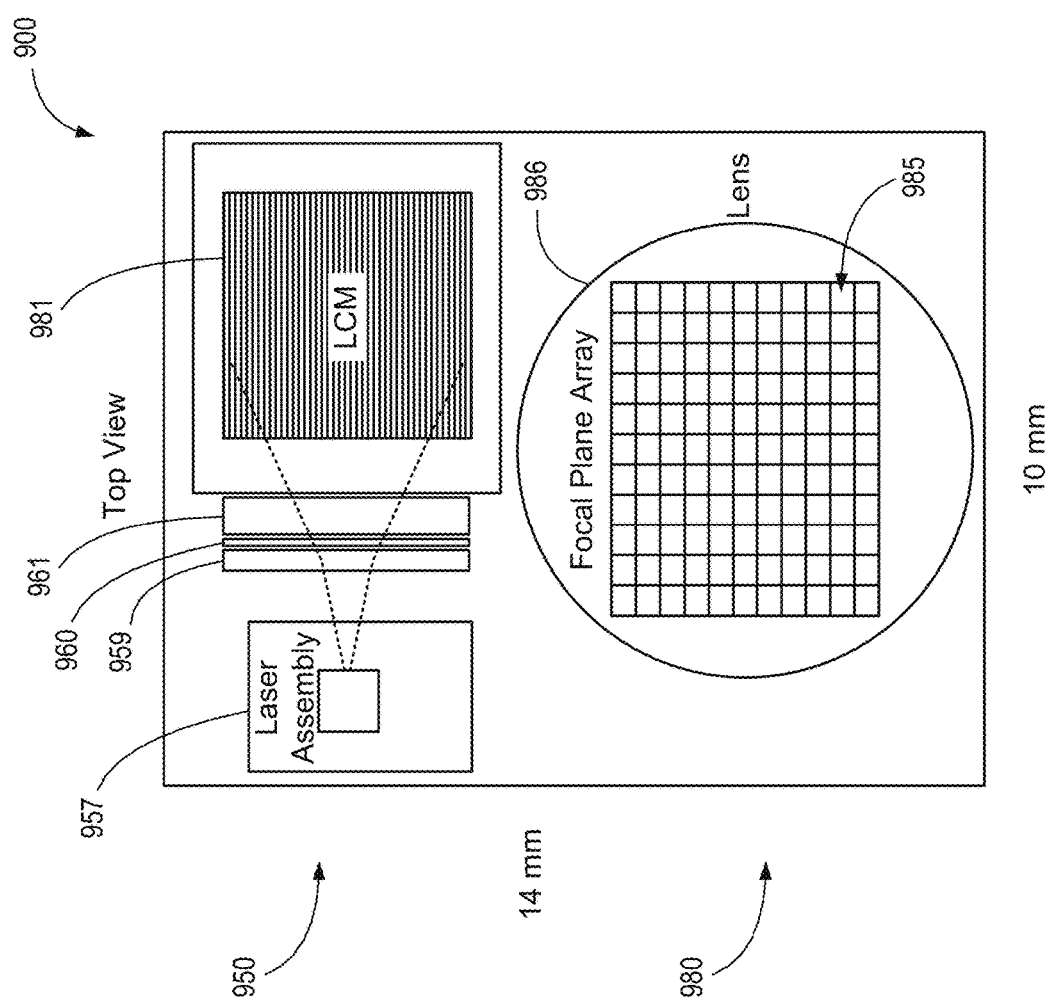
FIG. 9A illustrates a top-down view of an example layout of a solid-state transceiver system with a transmitter with incident optical radiation parallel to rails of a tunable LCM, according to one embodiment.

FIG. 9A illustrates a top-down view of an example layout of a solid-state transceiver system 900 with a transmitter 950 with incident optical radiation parallel to rails of a tunable LCM 981, according to one embodiment. The specific example of the solid-state transceiver system 900 has a width of approximately 10 millimeters and a length of approximately 14 millimeters. The transmitter 950 includes a laser assembly 957 that includes one or more laser drivers and diode lasers to generate optical radiation. The generated optical radiation is refracted by optical elements, including a lens 959, a volume Bragg grating element 960, and a prism 961 for collimation on the tunable LCM 981. As described herein, the volume Bragg grating element 960 may lock the laser assembly 957 to lock in a narrower linewidth to decrease the dispersivity of transmit scan lines.

A receiver subsystem 980 may include receiver optics 986 (e.g., one or more lenses) over a two-dimensional array 985 of detector elements. Each column of detector elements in the two-dimensional array 985 of detector elements may form a receive scan line. The receiver optics 986 may map optical radiation received from each discrete receive scan angle to a unique receive scan line of detector elements (e.g., a single column of detector elements). In some embodiments, multiple columns of detector elements may map to a single receive scan line. In such embodiments, the receiver optics 986 may map optical radiation received from each discrete receive scan angle to a unique receive scan line of detector elements, where the unique receive scan line comprises multiple columns of detector elements.

Figure 9B:
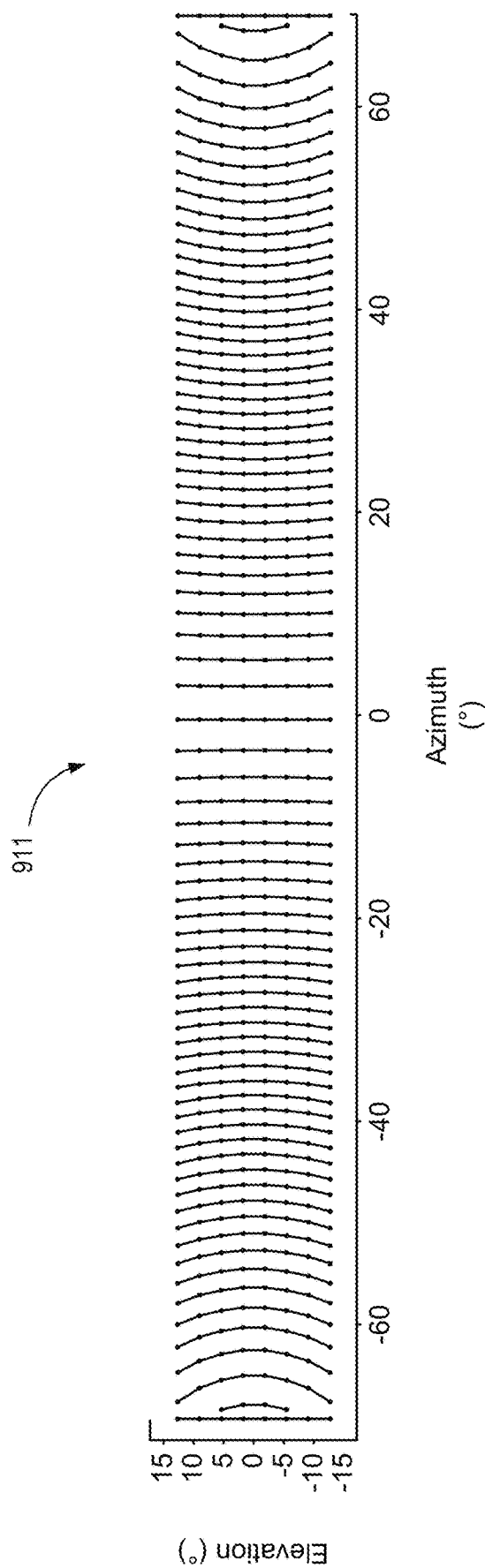
FIG. 9B illustrates the symmetrical diffractive curvature of the optical radiation for the transmitter of the solid-state transceiver system, according to one embodiment.

FIG. 9B illustrates the symmetrical diffractive curvature of the optical radiation transmit scan lines 911 for the transmitter of the solid-state transceiver system of FIG. 9A at positive and negative steering angles. The symmetric curvature is a result of the optical radiation from the laser assembly being incident on the LCM parallel to the rails thereof, as illustrated in FIG. 9A. As previously described in conjunction with FIG. 8H, the symmetric curvature can be alternatively achieved using correction optics positioned between the laser and the LCM. Since the diffractive curvature of the optical radiation transmit scan lines 911 of the transmitter are symmetrical, curvature-correcting multi-element lenses may be used on the receiver to effectively straighten optical radiation reflected by objects illuminated by the curved transmit scan lines 911.

Figure 9C:
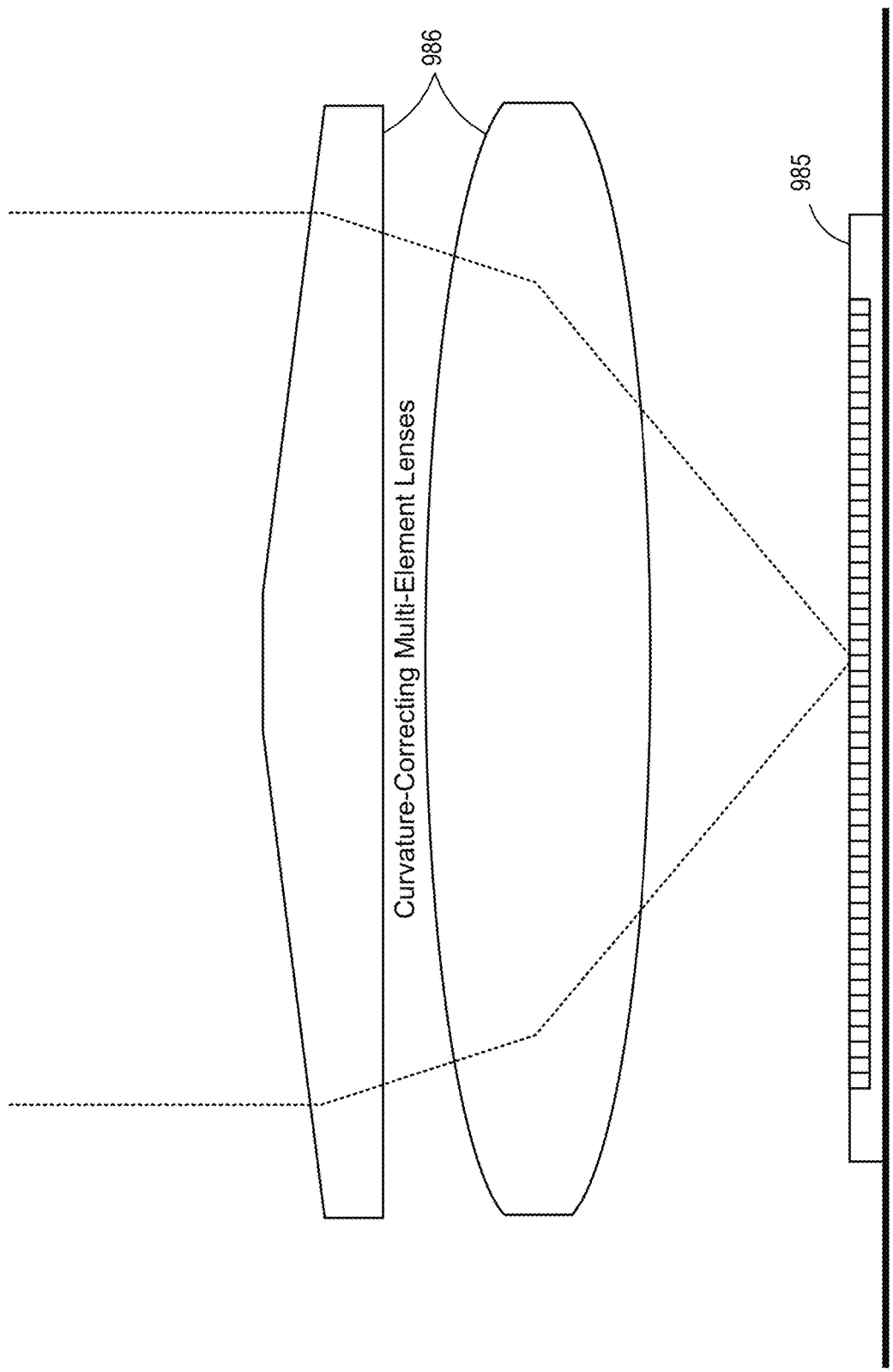
FIG. 9C illustrates a side view of the example layout of the two-dimensional array receiver of the solid-state transceiver system with a curvature-correcting multi-element lens, according to one embodiment.

FIG. 9C illustrates a side view of the example layout of the receiver of FIG. 9A with a two-dimensional array 985 of detector elements. The receiver optics 986 may include curvature-correcting multi-element lenses to correct the curved transmit scan lines so that each (curved) transmit scan line can be received by a single (straight) receive scan line.

Figure 9D:
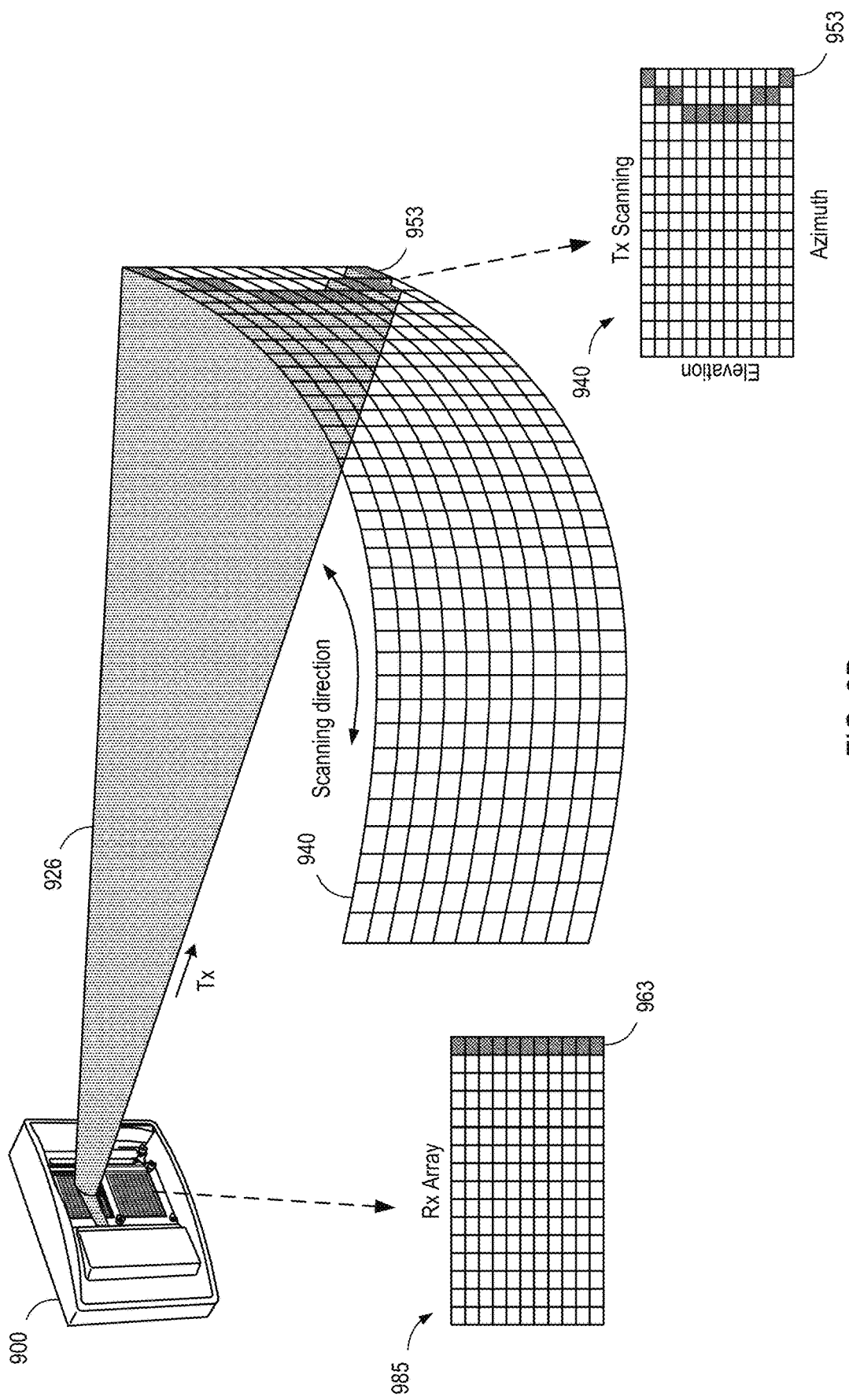
FIG. 9D illustrates azimuth scanning via the solid-state transceiver system with a transmitter at a negative steering angle, according to one embodiment.

FIG. 9D illustrates azimuth scanning via the solid-state transceiver system 900 with a transmitter at a negative steering angle, according to one embodiment. At the negative steering angle, the transmitted optical radiation 926 produces a diffraction curved transmit scan line 953. The curved transmit scan line 953 is shown on a flattened grid 940 on the right side of FIG. 9D to clearly illustrate the curved transmit scan line 953. FIG. 9D also includes a zoomed-in view of the two-dimensional array 985 of detector elements of the receiver of the solid-state transceiver system 900.

Receiver optics may direct optical radiation from each receive steering angle to a unique receive scan line. Although the transmit scan line 953 is curved, the receiver optics correct the curvature such that a single receive scan line 963 can capture the optical radiation of the transmit scan line 953 reflected from distant objects.

Figure 9E:
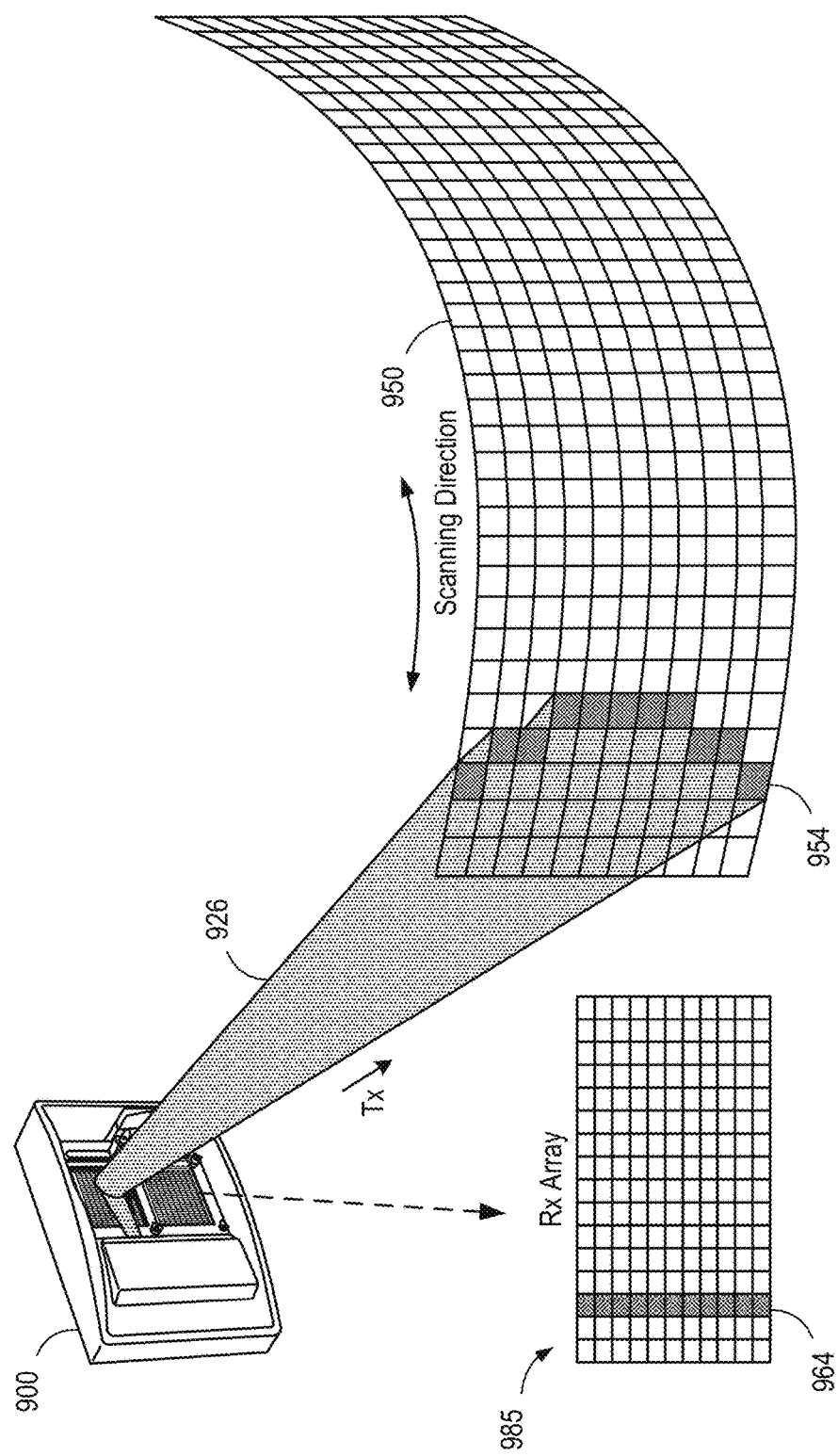
FIG. 9E illustrates azimuth scanning via the solid-state transceiver system with a transmitter at a positive steering angle, according to one embodiment.

FIG. 9E illustrates azimuth scanning via the solid-state transceiver system 900 with a transmitter at a positive steering angle, according to one embodiment. At the positive steering angle, the transmitted optical radiation 926 produces a diffraction curved transmit scan line 954. In the zoomed-in view of the two-dimensional array 985, a single receive scan line 964 receives the reflected optical radiation from the curved transmit scan line 954, but the optical radiation is curvature-corrected by receiver optics comprising one or more lenses.

Figure 10B:
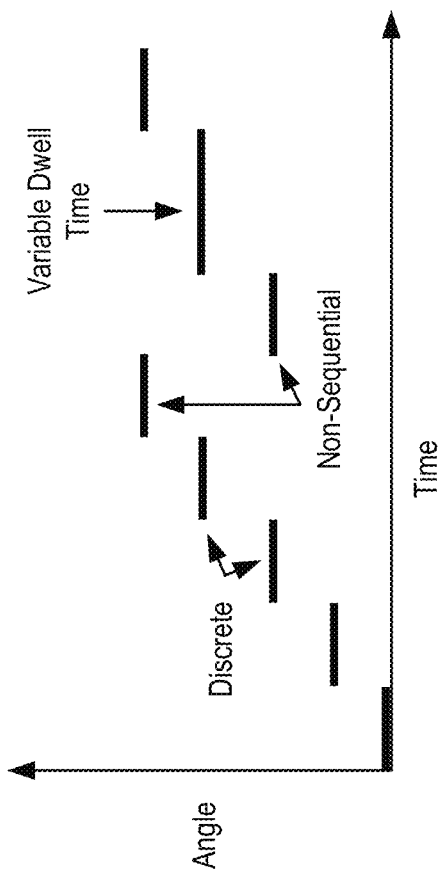
FIG. 10B illustrates a graph of the transmit angle of a solid-state transceiver system utilizing a one-dimensionally steerable LCM, according to one embodiment.
Figure 10A:
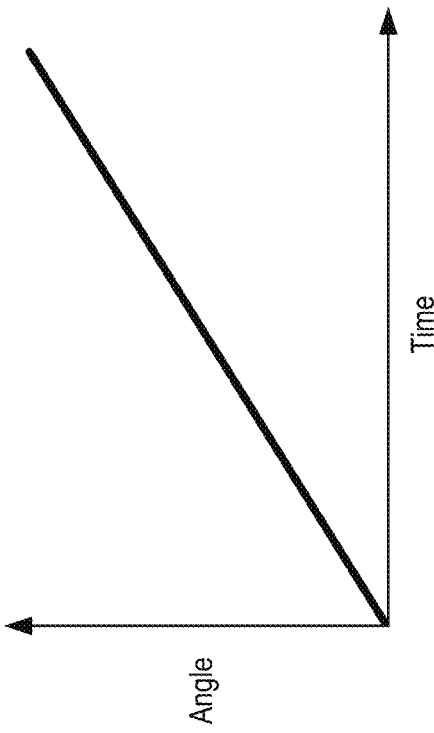
FIG. 10A illustrates a graph of the transmit angle of a mechanical scanning lidar system with respect to time, according to one embodiment.

FIG. 10A illustrates a graph of the transmit angle of a mechanical scanning lidar system with respect to time, according to one embodiment. As illustrated, the transmit angle of the mechanical scanning lidar system moves continuously with respect to time. The transmit angle of the mechanical scanning lidar system also moves sequentially from a first angle to a final angle and then repeats (optionally in reverse). The amount of time the mechanical scanning lidar system remains within a range of transmit angles is static and based on the scanning speed of the mechanical scanning lidar system.

FIG. 10B illustrates a graph of the transmit angle of a solid-state transceiver system utilizing a one-dimensionally steerable LCM, according to one embodiment. In contrast to the embodiment described in FIG. 10A, the transmit angle of the LCM-based solid-state transceiver system moves in discrete steps and maintains each steering angle for a fixed amount of time. Moreover, the LCM-based solid-state transceiver system can also transition instantly or nearly instantly between non-sequential transmit steering angles without having to steer to all the angles therebetween. The amount of time the LCM-based solid-state transceiver system remains at a specific transmit angle can be adjusted or modified for a particular application.

Various combinations of the embodiments and examples described herein are possible, including those specifically identified in the claims below, as well as in the following aspects.

Aspect 1: A system, comprising: a lockable laser assembly to: transmit optical radiation at an initial bandwidth in an unlocked state, and transmit optical radiation at a post-initialization bandwidth in a locked state, wherein the post-initialization bandwidth is narrower than the initial bandwidth; a transmit tunable optical metasurface to receive optical radiation from the laser assembly and steerably beamform the optical radiation at a steering angle to a remote object; a receiver with at least one detector element to receive reflected optical radiation at the steering angle from the remote object; and an optical assembly positioned between the laser assembly and the transmit tunable optical metasurface, wherein the optical assembly comprises: at least one optical lens element; and a feedback element to reflect some of the optical radiation at a wavelength within the initial bandwidth back into the laser to cause the laser to transition from the unlocked state to the locked state.

Aspect 2: The system of aspect 1, wherein the lockable laser assembly comprises at least one of an edge-emitting laser diode, a vertical-cavity surface-emitting laser, a fiber optic laser device, and a diode-pumped solid-state laser.

Aspect 3: The system of aspect 1, wherein the feedback element comprises a volume Bragg grating element.

Aspect 4: The system of aspect 1, wherein the receiver comprises a receive tunable optical metasurface to receive reflected optical radiation from the remote object via receive beamforming at the steering angle, and wherein each of the transmit and receive tunable optical metasurfaces comprises an array of optical resonant antennas arranged at sub-wavelength intervals on a reflective surface, and liquid crystal positioned in optical field regions of each optical resonant antenna in the array.

Aspect 5: The system of aspect 1, further comprising a voltage controller to control the steering angles of the transmit and receive tunable optical metasurfaces by selectively applying voltage differential bias patterns to the liquid crystal of the respective arrays of optical resonant antennas of each of the transmit and receive tunable optical metasurfaces.

Aspect 6: The system of aspect 1, wherein the receiver comprises: a two-dimensional array of detector elements forming a set of receive scan lines, wherein each receive scan line comprises at least one column of detector elements; and receiver optics to direct optical radiation incident at each of a plurality of discrete receive steering angles to one of the receive scan lines.

Aspect 7: The system of aspect 6, wherein the two-dimensional array of detector elements comprises a two-dimensional array of avalanche photodiodes (APDs).

Aspect 8: The system of aspect 6, wherein the two-dimensional array of detector elements comprises a two-dimensional array of single-photon avalanche diodes (SPADs).

Aspect 9: The system of aspect 6, wherein each column of detector elements forms a single receive scan line.

Aspect 10: The system of aspect 1, wherein the lockable laser assembly transmits optical radiation at an operating wavelength of one of 850 nanometers, 905 nanometers, and 1550 nanometers.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. An optical transceiver system, comprising:
a tunable, optical metasurface to selectively transmit incident optical radiation from an optical radiation source at transmit steering angles between a first steering angle and a second steering angle;
a receiver comprising a two-dimensional array of detector elements forming a set of receive scan lines, wherein each receive scan line corresponds to distinct angles of incidence; and
receiver optics to direct optical radiation received at each angle of incidence to the corresponding receive scan line.

2. The system of claim 1, further comprising a controller to:
tune the optical metasurface to transmit incident optical radiation at the first transmit steering angle; and
cause the receiver to detect reflections of the optical radiation via a subset of the receive scan lines associated with receive angles of incidence corresponding to the first transmit steering angle.

3. The system of claim 2, wherein the controller is configured to subsequently tune the optical metasurface to transmit incident optical radiation at a third steering angle between the first steering angle and the second steering angle that is non-sequential with respect to the first transmit steering angle; and
cause the receiver to detect reflections of the optical radiation via a subset of the receive scan lines associated with the receive angles of incidence corresponding to the third, non-sequential transmit steering angle.

4. The system of claim 1, further comprising a laser assembly to generate the optical radiation incident on the optical metasurface.

5. The system of claim 4, wherein the receiver optics comprise a bandpass filter to attenuate optical radiation at wavelengths not generated by the laser assembly.

6. The system of claim 1, wherein the optical metasurface comprises a liquid crystal metasurface (LCM) with an array of elongated optical resonant antennas arranged at sub-wavelength intervals on a reflective surface and liquid crystal positioned in optical field regions of each optical resonant antenna in the array.

7. The system of claim 6, wherein the optical radiation is incident on the LCM perpendicular to the elongated optical resonant antennas.

8. The system of claim 7, wherein the receiver optics adjust for asymmetrical curvature at various transmit steering angles.

9. The system of claim 6, further comprising a correction optical assembly to modify optical radiation incident on the LCM such that transmitted optical radiation exhibits symmetrical curvature between negative and positive steering angles.

10. The system of claim 9, wherein the receiver optics adjust for the symmetrical curvature of the transmitted optical radiation.

11. The system of claim 6, wherein the optical radiation is incident on the LCM parallel to the elongated optical resonant antennas.

12. The system of claim 11, wherein the receiver optics adjust for symmetrical curvature of the transmitted optical radiation.

13. A solid-state light detection and ranging (lidar) system, comprising:
a laser assembly to generate optical radiation;
transmit optical element assembly to modify the optical radiation generated by the laser assembly;
a tunable, optically reflective transmit metasurface to selectively reflect the modified optical radiation as transmit scan lines at a plurality of transmit steering angles;
an array of detector elements forming a set of receive scan lines of detector elements to receive optical radiation transmitted by the transmit metasurface after being reflected by distant objects, wherein each receive scan line corresponds to distinct angles of incidence of received optical radiation;

a receiver optical element assembly to focus the optical radiation reflected by the distant objects onto each respective receive scan line of the array of detector elements based on the angle of incidence; and a controller to:
cause the laser assembly to generate optical radiation,
tune the transmit metasurface to transmit the optical radiation as a first transmit scan line at a first transmit steering angle,
cause the array of detector elements to detect reflections of the optical radiation via a first receive scan line of detector elements associated with angles of incidence of the receiver optical element assembly that correspond to the first transmit steering angle, and
determine range information of an object detected in the first receive scan line.

14. The system of claim 13, wherein the optically reflective metasurface comprises a liquid crystal metasurface (LCM) that includes an array of optical resonant antennas arranged at sub-wavelength intervals on a reflective surface with liquid crystal positioned in optical field regions of each optical resonant antenna in the array.

15. The system of claim 14, further comprising a voltage controller to control the transmit steering angle of the optically reflective metasurface by selectively applying voltage differential bias patterns to the liquid crystal within the optical field regions of at least some of the optical resonant antennas.

16. The system of claim 13, wherein the controller determines the range information using one of: an indirect time-of-flight calculation, a direct time-of-flight calculation, and a coherent heterodyne calculation.

17. The system of claim 13, wherein the controller is configured to:
cause the laser assembly to generate sequential pulses of optical radiation,
cause the optically reflective metasurface to sequentially transmit optical radiation as a sequence of transmit scan lines at a corresponding sequence of transmit steering angles between the first steering angle and the second steering angle,
cause the array of detector elements to sequentially detect reflections of the pulsed optical radiation via distinct receive scan lines of detector elements associated with angles of incidence of received optical radiation from distant objects that correspond to the sequence of transmit steering angles, and
determine range information of objects detected in each sequential receive scan line.

18. The system of claim 13, wherein the array of detector elements comprises a two-dimensional array of columns and rows of detector elements and
wherein the receiver optical element assembly directs optical radiation at each angle of incidence to one or more columns of the array of detector elements.

19. The system of claim 13, wherein the transmit optical element assembly comprises:
at least one collimating optical element to collimate the optical radiation along a steering axis of the transmit metasurface; and
at least one diverging optical element to fan the optical radiation perpendicular to the steering axis of the transmit metasurface.

* * * * *